Oct. 31, 1972  R. G. FRANK  3,701,644
METHOD AND APPARATUS FOR SHAPING GLASS
SHEETS WITH OPPOSED ROLLER SETS
Filed Nov. 3, 1971  13 Sheets-Sheet 1

United States Patent Office 3,701,644
Patented Oct. 31, 1972

3,701,644
METHOD AND APPARATUS FOR SHAPING GLASS SHEETS WITH OPPOSED ROLLER SETS
Robert G. Frank, Monroeville, Pa., assignor to PPG Industries, Inc., Pittsburgh, Pa.
Continuation-in-part of applications Ser. No. 18,242, Mar. 10, 1970, and Ser. No. 95,015, Dec. 4, 1970. This application Nov. 3, 1971, Ser. No. 195,152
Int. Cl. C03b 23/02
U.S. Cl. 65—106                                36 Claims

ABSTRACT OF THE DISCLOSURE

Shaping a succession of continuously moving discrete, heat-softened glass sheets by momentarily engaging the opposite surfaces of each sheet in succession at longitudinally spaced longitudinal increments between opposed rolls of complementary shape as each sheet moves continuously through a press bending station and disengaging the sheets after momentary pressurized engagement after the sheet has been shaped but before any longitudinally spaced increment is subjected to pressurized engagement between more than two pairs of adjacent rolls.

CROSS REFERENCE TO OTHER APPLICATIONS

This application is a continuation-in-part of application Ser. No. 18,242 of Robert G. Frank, filed Mar. 10, 1970, for Shaping Glass Sheets, now abandoned, and application Ser. No. 95,015 of Robert G. Frank, filed Dec. 4, 1970, for Apparatus for Heat Treating Glass Sheets, now abandoned.

BACKGROUND OF THE INVENTION

The present invention relates to shaping glass sheets, and particularly concerns a method and apparatus for press bending a series of glass sheets. In the method, each glass sheet is heated to its deformation temperature while conveyed through a furnace, then press bent to shape when it leaves the furnace by momentarily and simultaneously engaging the opposite glass sheet surfaces at longitudinally spaced increments between a pair of sets of shaped rolls having complementary shapes without interrupting forward motion of the sheet for sufficient time to impress a desired shape onto the glass, discontinuing the pressurized engagement before the entire glass sheet has traversed the entire area occupied by the roll sets, and then cooling the shaped sheet. The embodiments of the apparatus may be converted to flat glass tempering apparatus that omits press bending by merely maintaining the shaped rolls in spaced relation to the opposite glass sheet surfaces when the sheets traverse the shaping station.

Glass sheets have been shaped to a desired configuration prior to the present invention by a process known as press bending. In this process, a succession of glass sheets is conveyed through a heated furnace of tunnel-type configuration. When the leading sheet of the series reaches its deformation temperature, it is transferred rapidly to a press bending station. The movement of the beat-softened glass sheet is interrupted when it reaches a position of alignment between a pair of retracted press bending molds having complementary shaping surfaces conforming to the shape to be imparted to the glass sheet. The molds then engage the opposite major surfaces of the glass sheet in a manner similar to that of a die stamping operation. The molds continue to engage the heat-softened glass for a period of time sufficient to insure that the glass retains its shape after the molds retract.

If the glass is to be tempered, it is then cooled at a rapid rate to below its strain point. This latter cooling is sometimes accomplished at the press bending station and sometimes accomplished at a cooling station located beyond the press bending station.

In either case, the time that a glass sheet spends at the shaping station plus the time needed to decelerate the sheet to insure its stopping at a proper position of alignment between the press bending molds and the time needed to restart the bent sheet from its position of rest after its treatment at the press bending station is completed imposes a limitation on the maximum rate of production of press bent glass articles. In addition, it limits the thickness of glass sheets that can be press bent and tempered to sheets sufficiently thick to both retain their shape and also remain at a sufficiently high temperature upon their arrival at the cooling area to enable them to be heat-strengthened or fully tempered as desired.

Glass sheets have also been shaped using rotating elements to help shape the heat-softened glass. U.S. Patent No. 2,348,887 to Drake passes each glass sheet between a pair of pressing rolls then over a series of spaced rolls mounted at different elevations to impart a curvature about an axis transverse to the direction of glass movement. U.S. Patent No. 3,545,951 to Nedelec conveys glass sheets on rotatable sleeves carried by arcuate rods pivoted on chordal axes between a flat glass support position and a curved glass support position. Upper arcuate rods or forms engage the upper glass surface as the arcuate rods provide a lifting force to the lower glass surface to shape the glass about an axis of curvature parallel to the direction of glass movement. Each glass sheet increment is subject to pressurized engagements against several rolls, which increases the likelihood of marring the glass sheet. In addition, none of the prior art is capable of producing a compound bend about 2 axes of bending angularly disposed relative to each other.

The present invention makes it possible to heat treat a succession of glass sheets for press bending the latter on a mass production basis at a much more rapid rate and to more complicated shapes than is possible with the prior art. Since a faster production rate reduces the time it takes a glass sheet to traverse the distance from the exit of the furnace to the cooling area, which distance comprises the press bending station, the present invention makes it possible to handle thinner glass sheets than the prior art. Roll marking of the hot glass surfaces that occurs when heat-softened glass sheets are roll formed while the entire length of their opposite surfaces are engaged between opposed rolls that nip the glass as depicted in U.S. Pat. No. 3,226,219 to F. Jamnik or 2,348,887 to Drake is reduced to such an extent by the present invention that it is invisible to the eye of an ordinary consumer. The present invention also makes it possible to shape continuously moving glass sheets to complex curvatures involving curves about axes both parallel and transverse to the path of movement and nonuniform curves that vary along a dimension of the glass sheet parallel to the direction of movement. Thus, the present invention provides an improvement over the apparatus of U.S. Pat. No. 3,545,951 to Nedelec, which is capable of shaping glass sheets about one axis only to a shape that is uniform from end to end of the sheet. Furthermore, the Nedelec apparatus engages the glass sheets for their entire length so that each longitudinal increment is engaged in pressurized engagement between a plurality of rolls as the sheet traverses the shaping station with consequent danger of roll marking.

SUMMARY OF THE INVENTION

The present invention makes it possible to avoid the need to stop the motion of each glass sheet as it undergoes press bending as depicted in U.S. Pat. No. 3,374,080 to Robert W. Wheeler, and, at the same time, reduces the incidence and severity of surface damage to the hot glass that results from using prior art apparatus for shaping continuously moving sheets. This is accomplished by providing press bending apparatus comprising a set of rotatable shaped rolls that serve as the complementary shaping surfaces that momentarily engage the heat-softened glass sheet in rolling, pressurized contact at longitudinally spaced regions for sufficient time only to shape the glass. The pressurized contact is removed before substantial surface marking takes place and stays removed until the glass is cooled and its surfaces set At least one of the molds has all of its shaped rolls to one side of a path of travel for the glass sheets defined by the spaced rolls of a conveyor, while the other mold is capable of movement between a retracted position wherein its shaped rolls are all disposed on the opposite side of said path of travel and a glass engaging position on the one side of said path of travel.

In order to reduce the hazard of the rolls marring the glass surface, the shaped rolls are preferably segmented with at least one of the segments of at least one roll of each pair of opposing complementary shaped rolls driven at a peripheral speed substantially equal to the speed of glass sheet movement along the conveyor. Each segment of the segmented shaping rolls that is not driven is preferably free-running so that the peripeheries of the shaping roll segments do not rub relative to the glass surfaces. The shaping rolls are composed of a refractory material, such as asbestos or the like, that does not mar heat-softened glass. In addition, each set of rolls is mounted in a housing and means is provided to actuate movement of each housing separately so that all the shaped rolls move in unison between the retracted position and the glass engaging position. By having each opposed pair of rolls engage a limited portion of the glass sheet dimension in the direction of movement, thereby limiting the duration of the time that the shaped rolls engage the glass in pressurized engagement to the time needed to shape different portions of the glass simultaneously, the severity of the marking imposed is limited. This time has been determined to be approximately equal to the time each of the longitudinally spaced elements of the glass sheet undergoing processing moves from a position between one pair of opposing rolls to a position between the next adjacent pair or at most, to a position between the next pair of shaping rolls beyond the next adjacent pair. Hence, there is no more glass surface marking resulting from the present roll forming operation than results from a conventional press bending operation in which glass sheets are not moved when engaged between the press bending molds.

Each housing is provided with a pair of brackets for rotatably supporting the opposite ends of a straight shaft on which each segmented shaping roll is mounted. By controlling the positions of the ends of each shaft, it is possible to control the shape imparted simultaneously to different moving increments of the glass sheet so that it is possible to impart a shape combining the shape of the shaping rolls about an axis parallel to the direction of glass movement with a shape about an axis transverse to the direction of glass movement as determined by the relative positions of the ends of the shafts of each set of rolls.

The apparatus of the present invention also is capable of subjecting a succession of glass sheets to thermal treatment that omits the press bending step. In order to accomplish this alternative objective, the shaping rolls are maintained in a retracted position spaced from the glass sheet surfaces as the latter are moved rapidly from the furnace to the cooling station on a main conveyor.

The present invention will be understood better in the light of a description of an illustrative embodiment that follows. While the illustrative embodiment shows how the present invention can improve a so-called horizontal press bending operation in which the glass is supported in a horizontal plane while transported on a conveyor through a tunnel-type furnace, a press bending station and a cooling station, it is also understood that the present invention is also capable of use with glass sheet conveyor systems that transport glass sheets while oriented in a vertical plane or one or more oblique planes or any combination of orientations during thermal processing that includes a shaping step.

BRIEF DESCRIPTION OF THE DRAWINGS

In the drawings which form part of the description of the illustrative embodiment that follows.

DESCRIPTION OF THE PREFERRED EMBODIMENTS

Figure 1:
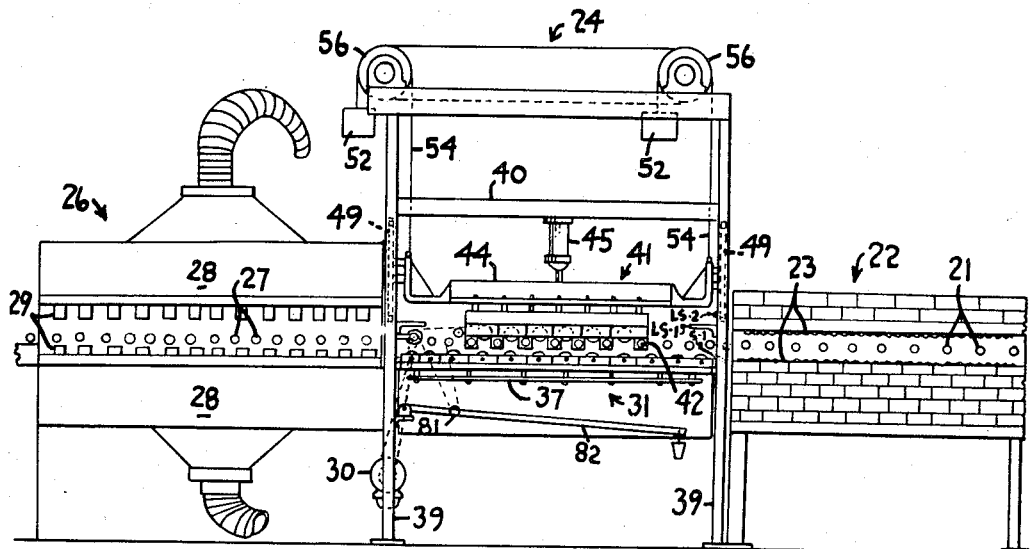
FIG. 1 is a longitudinal end view of apparatus conforming to the present invention arranged to produce a simple one way bend about an axis parallel to the direction of glass movement.
Figure 2:
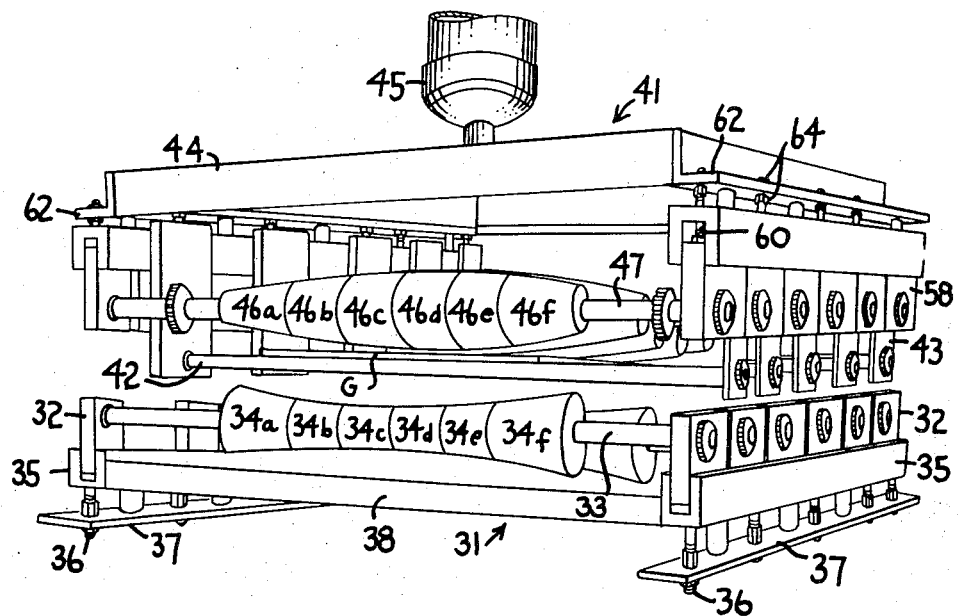
FIG. 2 is a fragmentary perspective view of a portion of the roll-type press bending station incorporated in the apparatus of FIG. 1.

Referring to the drawings, a main horizontal conveyor system comprises a first section including a series of horizontal rolls 21 of one inch diameter spaced three inches apart that provide a common horizontal plane of support for conveying a succession of glass sheets G therealong. The conveyor system extends through a tunnel-type furnace 22, a novel shaping station 24, and a cooling station 26 and also includes special conveyor rolls 27 for the cooling station 26, each of the latter of which may comprise a spring deformable into the shape of the supported glass sheets and a flexible fiber glass sleeve of the type depicted in U.S. Patent No. 3,485,618.

The tunnel-type furnace 22 may be of any type typical of the prior art as is the cooling station 26. The furnace 22 is preferably provided with heating elements 23, preferably of the electrical resistance type, supported by the roof and the floor of the furnace and arranged in spaced relation to the horizontal plane of support provided by the uppermost portions of the peripheries of the conveyor rolls 21 to face the major surfaces of the glass sheets conveyed therethrough. In the furnace, the conveyor rolls are composed of uncovered stainless steel, whereas the conveyor rolls at the shaping station 24 and the cooling station 26 are covered with fiber glass sleeves.

A single drive motor 30 (FIG. 3) drives all the rolls in the conveyor system. Thus, a glass sheet entering the heating furnace 22 at the loading end thereof is transported at a fixed rate of speed along its path of movement defined by the conveyor system. While the illustrative embodiment shows a roller type of conveyor system known as the roller hearth, it is understood that any type of heating system, such as the gas hearth described in U.S. Pat. No. 3,223,501 to James C. Fredley and George E. Sleighter, may be used to heat the succession of glass sheets to deformation temperature and transporting the sheets to the novel press bending station.

The cooling station 26 may be of any type of glass tempering or heat strengthening apparatus that is well known in the art. One type of cooling station that may be used is disclosed in U.S. Pat. No. 3,223,501 to James C. Fredley and George E. Sleighter. Another type of cooling station is disclosed in U.S. Pat. No. 3,245,772 to James H. Cypher and Charles R. Davidson, Jr. Preferably, it comprises upper and lower nozzle boxes 28, each having a set of elongated slot nozzle openings 29 extending transversely of the path defined by the portion of the conveyor system that extends through cooling station 26. The slot openings are preferably about 3/16-inch to 1/4-inch wide and about 3 to 4 inches apart in each set and the nozzle openings of one set are about 5 inches from the nozzle openings of the other set. Pressurized air from blowers (not shown) is supplied to the upper and lower nozzle boxes 28 for discharge through the nozzle openings 29 to cool bent glass sheets as they are conveyed through the cooling station 26.

If desired, exit doors of the type well known in the art may be included to intermittently close the exit slot opening of the furnace 22 and a similar door at the entrance of the cooling station 26 may be included to intermittently close the opening to the cooling station 26. This minimizes the exposure of the press bending station to the hot atmosphere of the furnace 22 at one end and to the cold blasts of the cooling station 26 at the other end.

The novel shaping station 24 of a first illustrative embodiment comprises a lower roll housing 31 rigidly supported in a horizontal plane below the level of the rolls 21 of the main conveyor system. The lower roll housing comprises a pair of sets of vertically adjustable brackets 32, each arranged in a horizontal row, with transversely aligned brackets apertured to receive the opposite axial ends of a series of straight, lower, common shafts 33 on which are mounted segmented pressing rolls 34 comprising segments 34a, 34b, 34c, 34d, 34e and 34f in the illustrative embodiment. The brackets 32 are received in and vertically adjustable relative to longitudinal, horizontally extending channels 35, one of which is provided at each side of the press bending station 24. Vertical adjustable support for the individual brackets 32 is provided by threaded shafts 36 supported in adjustable position by elongated, horizontally extending, apertured plates 37 disposed below channels 35 in fixed, vertically spaced relation thereto. Braces 38 interconnect the channels 35. Vertical ports 39 support the channels 35 by end connections shown in FIG. 3.

The vertical position of each bracket, as determined by adjustment of its associated threaded shaft 36, controls the position of an end of a lower common shaft 33. This establishes the orientation of the segmented rolls 34 that are mounted on the shafts 33. Each shaft 33 is straight to facilitate mounting and replacement of a segmented roll of desired configuration thereon.

The vertical posts 39 also rigidly support an upper horizontal platform 40 relative to which an upper roll housing 41 is adjustably positioned vertically. The upper roll housing 41 comprises a series of conveyor rolls 42 that normally lie in the same plane as the rolls 21 of the main conveyor system 20 in the furnace 22 and cooling station 26. Rolls 42 are rotatably supported in apertured vertical brackets 43 that are rigidly attached to and extend downward from a movable platform 44. A piston 45 has its moving end attached to movable platform 44.

In vertical planes intermediate the vertical planes occupied by rolls 42 and in alignment with the vertical planes occupied by segmented shaping rolls 34 of the lower set are a set of upper segmented shaping rolls 46, each comprising a plurality of segments 46a, 46b, 46c, 46d, 46e and 46f mounted on a straight, upper common shaft 47 for each upper shaping roll 46.

The piston 45 is secured at its upper end to the rigid horizontal platform 40. The latter, in turn, supports four alignment posts 49 extending vertically downwardly to engage collars 50 attached to the movable platform 44 to insure proper alignment of the latter.

Counterweights 52 are attached by chains 54 over pulleys 56 to reduce the effect required by the piston 45 to adjust the position of the movable platform 44 and the rest of the upper roll housing 41.

The vertical position of each end of the upper common shafts 47 supporting segmented rolls 46 is adjusted in a manner similar to the adjustments provided for the lower shafts 33 supporting the lower segmented rolls 34. For example, each upper shaft 47 is received rotatably in apertures in upper shaft brackets 58. The latter are rigidly connected at their upper ends to the lower ends of threaded rods 60. The latter extend upward through one or the other of a pair of horizontal flanges 62 forming part of the movable platform 44. Pairs of adjustment nuts 64 for each threaded rod, one nut mounted above the flange 62 and the other nut below the flange 62, determine the vertical position of each upper shaft 47.

Figure 4:
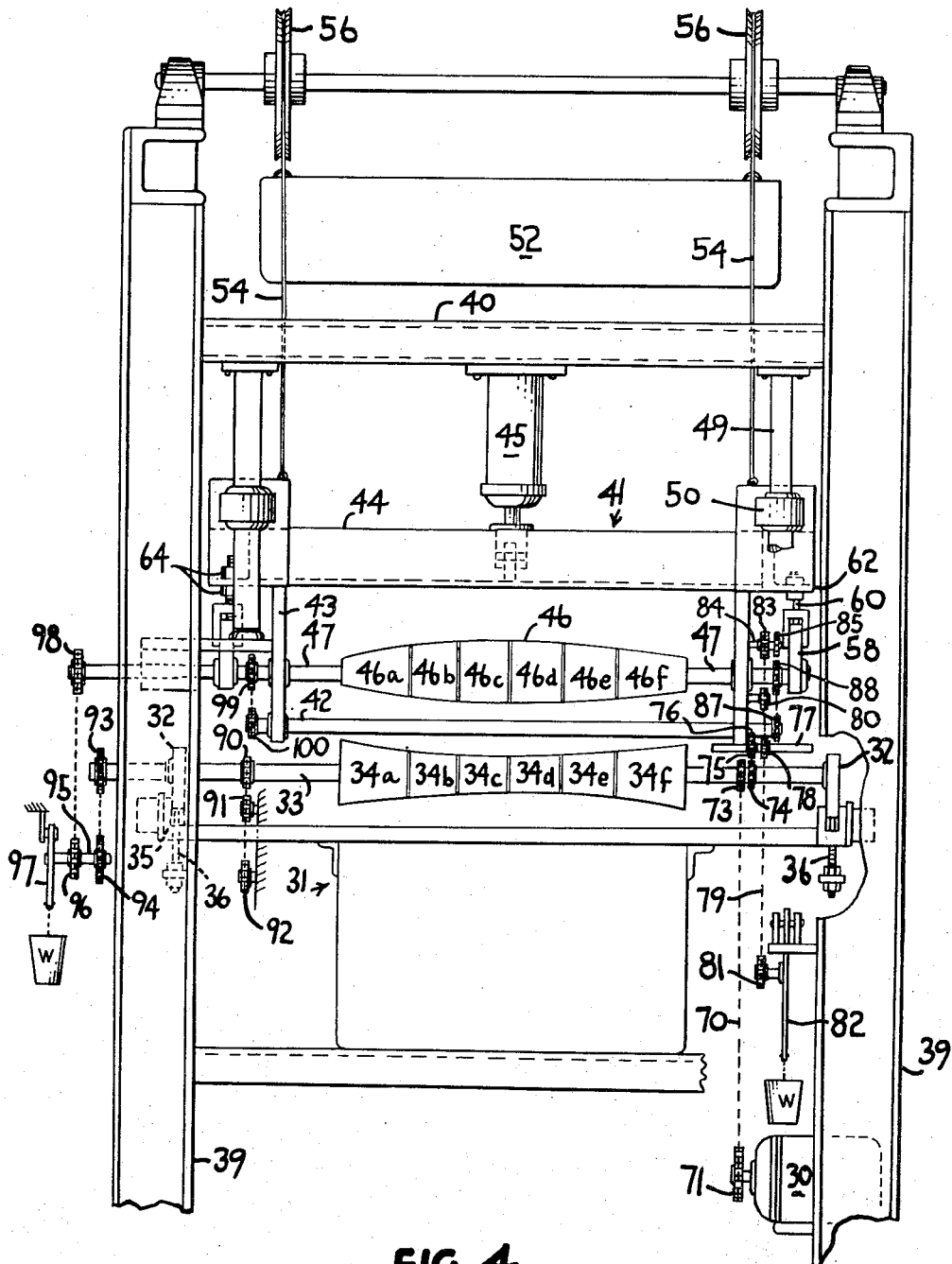

As is best shown in FIG. 4, the segments 34a–34f of the lower segmented rolls 34 form a substantially continuous roll having a generally concave contour in the axial direction of their common shafts 33 conforming to the shape desired along one dimension of the succession of glass sheets treated. The upper segments 46a–46f of the upper segmented rolls 46 have generally convex configurations that are complementary to the configurations of the lower roll segments they oppose. Hence, if all the upper segmented rolls 46 have their shafts 47 in horizontal alignment and the lower segmented rolls 34 have their shafts 33 in horizontal alignment, when piston 45 is extended, rolls 42, which support a hot glass sheet during its movement into the press bending station 24, are lowered to a horizontal plane below the positions occupied by the lower segmented rolls 34 and the moving glass sheet G is engaged between the lower rotating shaped rolls 34 and the upper rotating rolls 46 of complementary curvature to impose a transverse curvature on said sheet. The piston 45 retracts slightly after each pair of rolls has shaped a moving longitudinal increment of the sheet to permit the lower segmented rolls 34 to transport the bent glass sheet into the cooling station 26 in spaced relation above the conveyor rolls 42.

If the upper and lower shafts 47 and 33 are adjusted in a non-linear arrangement along similar arcuate lines, then the glass sheets can be bent into a compound curvature without impairing the smoothness of curvature of the glass sheet surfaces by limiting the duration of roll engagement to the glass to the time needed for each increment to traverse the distance between adjacent rolls. By having different pairs of rolls provided with segments of different curvature, the present invention makes it possible to simultaneously impart different shapes to different increments of the moving sheets, thus making possible further complications in the shapes possible to impart. In addition, adjusting the vertical position of the ends of common shafts 33 and 47 so that different pairs of shafts lie in different oblique planes makes it possible to impart a twisted shape to the glass sheets by simultaneously and momentarily engaging different moving longitudinal increments of the sheets. Of course, these shapes can be complicated further by combining the adjustments needed for each complication in shape.

Since the diameters of the segmented rolls vary along their axial length, if all the segments are keyed to rotate with the respective shafts 33, and 47, different segments would rotate at different peripheral speeds, thus tending to mark the glass during bending. A further aspect of the present invention minimizes marking from this source by keying only a pair of symmetrically arranged segments, for example, segments 34a and 34f of the lower segmented shaping rolls 34 and segments 47a and 47f of the upper segmented shaping rolls 47, and permitting the other segments of the shaping rolls to be free running. The free running segments 34b through 34e and 47b through 47e develop a peripheral speed equal to that of the moving glass sheet G as the latter is shaped during its conveyance through the press bending station 24.

Figure 5:
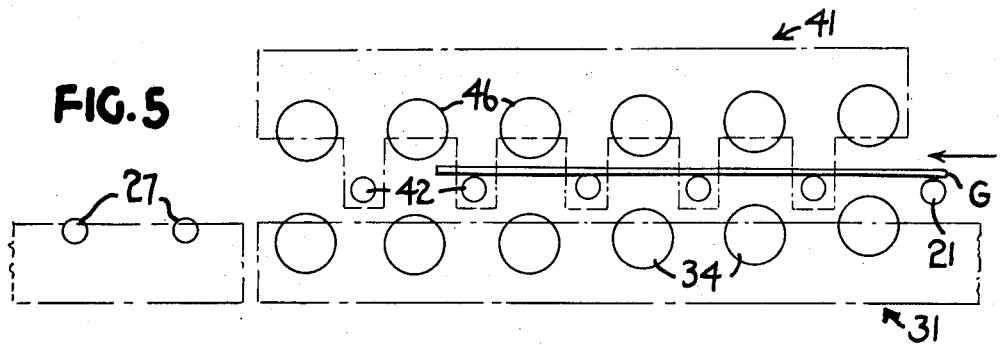
FIGS. 5, 6, 7 and 8 are fragmentary illustrative views showing the relative positions of the upper and lower sets of shaping rolls at different stages of a bending cycle, also showing how the individual positions of the segmented shaping rolls are adjusted to produce compound bends.

FIGS. 5 to 8 show how the position of the upper roll housing 41 is programmed during a typical roll pressing operation. In FIG. 5, a flat glass sheet G is shown entering the press bending station 24 with its leading edge carried on rotating conveyor rolls 42 while the trailing edge is still carried by conveyor rolls 21. The upper roll housing 41 is fully retracted upward to provide clearance between the rolls 42, which are at the same level as rolls 21 of the conveyor system 20, and the upper segmented rolls 46.

As soon as the trailing edge of the glass sheet G passes over the last roller 21 before the press bending station 24, piston 45 begins to extend downward to cause the upper segmented rolls 46 to approach their respectively aligned lower segmented rolls 34. A glass sensing device S-1 (FIG. 3) of the type well known in the art, such as fluidic sensing device, is used to detect the passage of the trailing edge of the glass sheet G to initiate actuation of the downward movement of the piston 45.

The upper platform 44 actuates a limit switch LS-1 when it reaches its lowest possible position. A timer actuated by limit switch LS-1 determines how long the piston 45 remains in the downward rest position. This timer is preferably adjusted to approximate the time it takes for an increment of the glass sheet to move from one set of shaping rolls to the next set, although roll marking is improved over the prior art roll shaping even when the shaping rolls continue in their pressurized engagement against the glass when the increments pass between two roll pairs before disengagement begins. However, it is not good for optical properties to have any glass increment pass in pressurized engagement between 4 or more pairs of shaping rolls.

Figure 6:
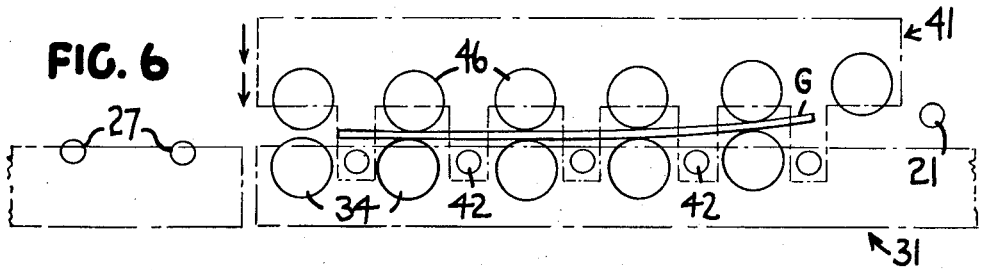

By the time the glass sheet G has reached the middle of the press bending station, upper segmented rolls 46 have engaged the upper surface of the moving glass sheet G and pressed the moving segments of the sheet downward against the lower segmented rolls 34. Rolls 42, at the same time, have moved downward below the level of the upper surfaces of the lower segmented rolls 34. Thus, the moving glass sheet is shaped while it moves in pressurized engagement between the sets of segmented rolls 46 and 34. This position is depicted in FIG. 6. Note that different spaced increments are simultaneously engaged between different pairs of shaping rolls.

When the timer actuated by limit switch LS-1 times out, piston 45 begins to retract, thus lifting the upper roll housing 41. A limit switch LS-2 is engaged when upper roll housing 41 reaches an intermediate position between the glass engaging position of FIG. 6 and the retracted position of FIG. 5. Limit switch LS-2 controls a second timer that inhibits further movement of piston 45 until it times out to maintain the upper roll housing in said intermediate position. In this position, the shaped glass sheet G continues to move through the shaping station 24 while conveyed on the lower shaping rolls 34.

Figure 7:
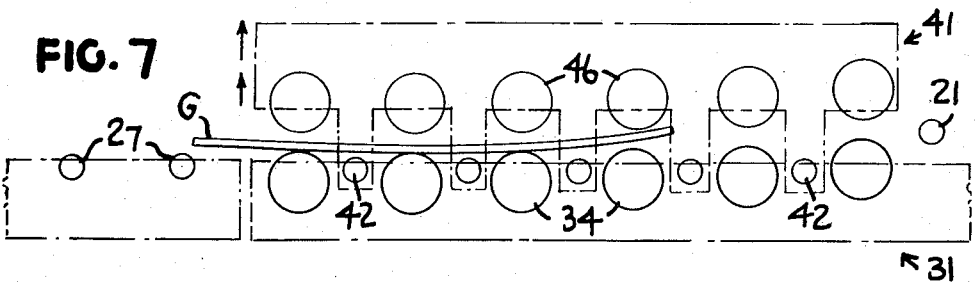

Until the leading edge of the shaped glass sheet G reaches the first roll 27 of the conveyor system 20 beyond the press bending station 24, the second timer controlling piston actuation continues to hold the upper segmented rolls 46 in the intermediate position about ¼ to ½ inch above the upper glass surface. At this level, the glass sheet is solely supported on the lower segmented shaping rolls 34 with the conveyor rolls 42 still below the plane of the glass. FIG. 7 shows this stage of a bending cycle.

Figure 8:
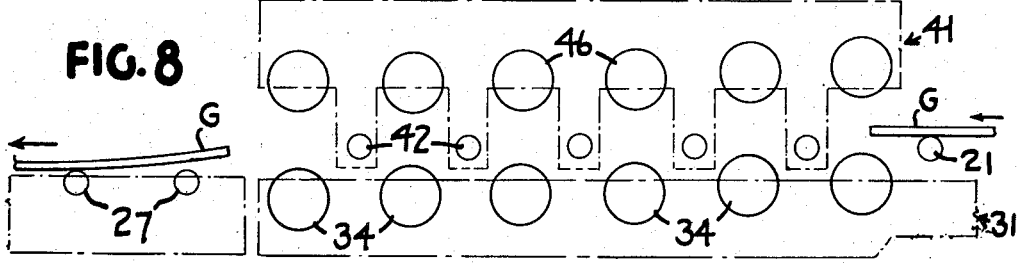

When the trailing edge of the bent glass sheet G passes over the first roll 27, the second timer times out to enable the piston 45 to complete its upward retraction and have rolls 42 move into the same horizontal plane as that occupied by rolls 21. It is thus inherent that the apparatus maintains the pairs of opposing shaping rolls retracted from pressurized engagement until the glass sheet cools sufficiently for its surface to set. The shaping station 24 is ready for its next cycle as shown in FIG. 8. A succession of glass sheet can be press bent without interrupting their forward movement through the press bending station.

It is a comparatively simple matter to replace one set of segments for another along each shaft whenever a change of production pattern is required. The vertically adjustable brackets 32 and 58 at one side of the apparatus are readily removable to permit the sliding removal of one set of segments and replacement with another with a minimum of time and effort.

Figure 3:
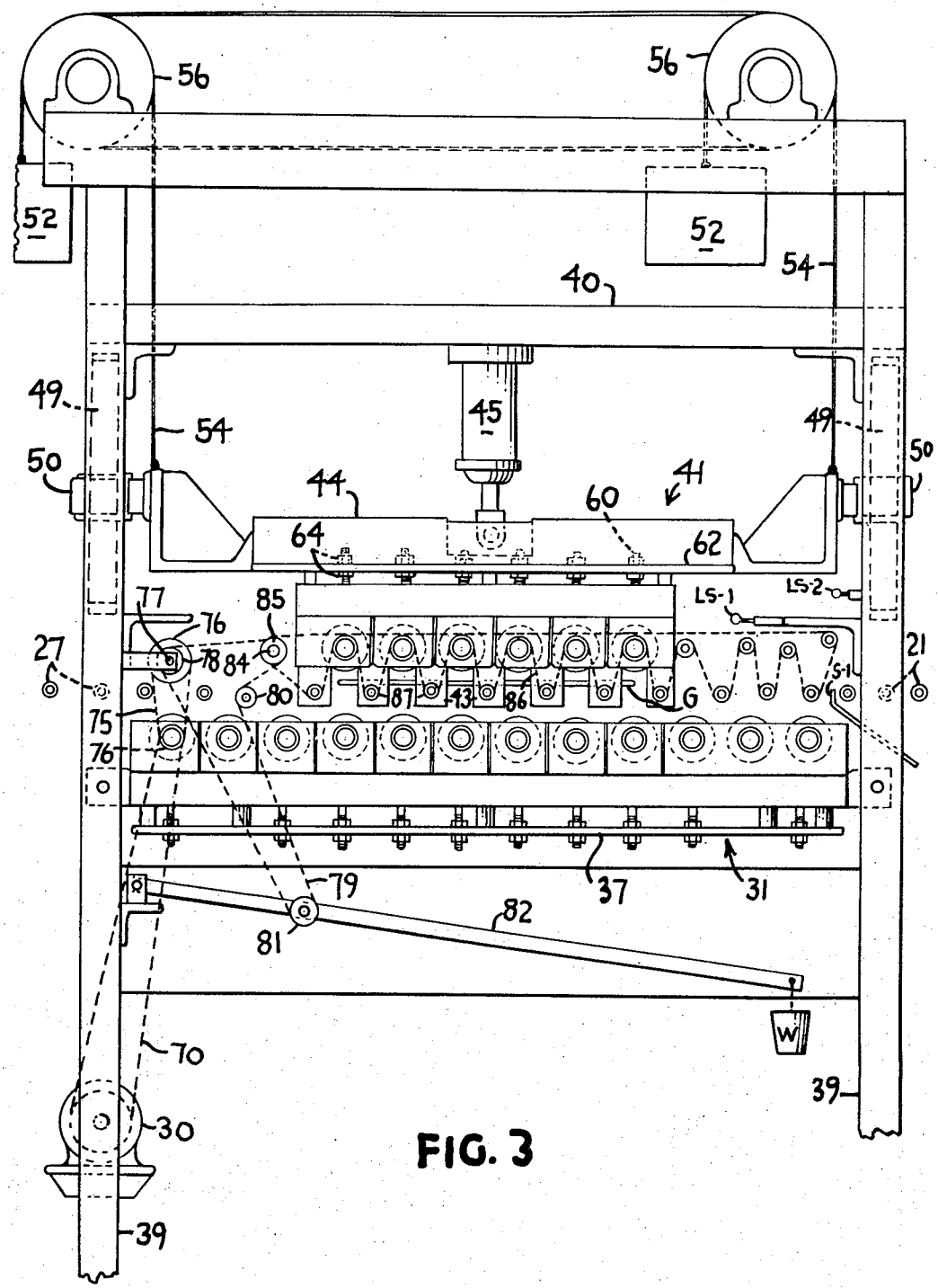
FIGS. 3 and 4 are enlarged, fragmentary end and transverse views, of the roll-type press bending station arranged as in FIG. 1.
Figure 9:
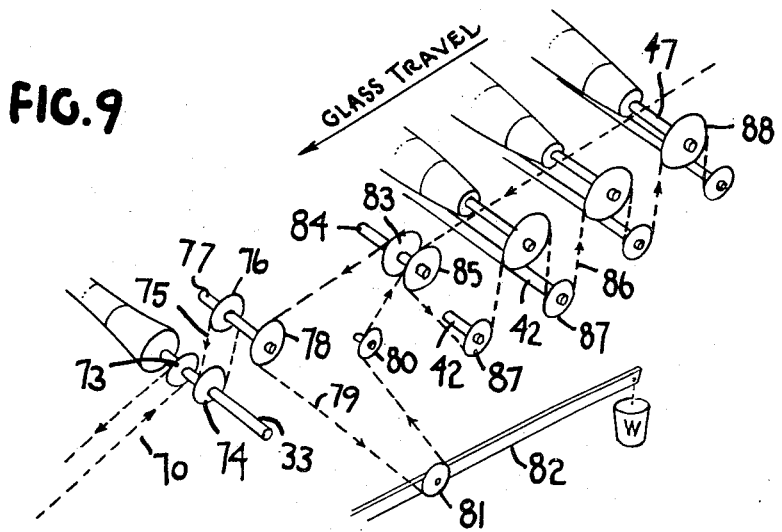
FIGS. 9 and 10 are fragmentary views illustrating the operation of chain drives that correlate the rotation of the main drive section of the movable roll-type press bending station with that of the main conveyor system.

Since the rolls 42 rotate at the same peripheral speed as rolls 21 and 27 of the main conveyor system 20, and the rolls 42 are vertically movable relative to the plane of support for the main conveyor system, a system had to be devised to achieve this goal. Referring particularly to FIGS. 3, 4 and 9, a drive chain 70 connects a drive pulley 71 mounted on the drive shaft of motor 30 to a sprocket 73 fixed to the last of the shafts 33. Another sprocket 74 on shaft 33 is connected by a chain 75 to drive a sprocket 76 on a jack shaft 77.

Another sprocket 78 on jack shaft 77 is connected via a chain 79 to a fixed idler sprocket 80 and a movable sprocket 81. The movable sprocket 81 is mounted on a pivoted, weighted lever arm 82 provided with a weight W at its free end. The weighted lever arm pivots in response to any slackening in the chain drive to insure no slippage.

The chain 79 also engages a sprocket 83 on a stub shaft 84 which drives all the conveyor rolls 42 through a sprocket 85 mounted on the stub shaft 84, a chain drive 86, a series of sprockets 87, each mounted on a different conveyor roll 42 and a series of idler sprockets 88, each freely rotatable about a different one of the upper shafts 47.

Figure 10:
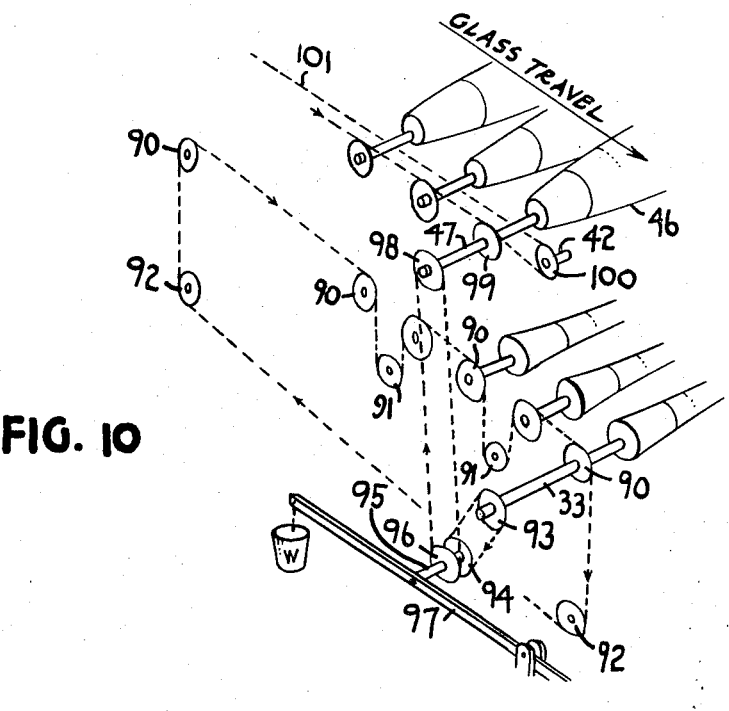
Figure 11:
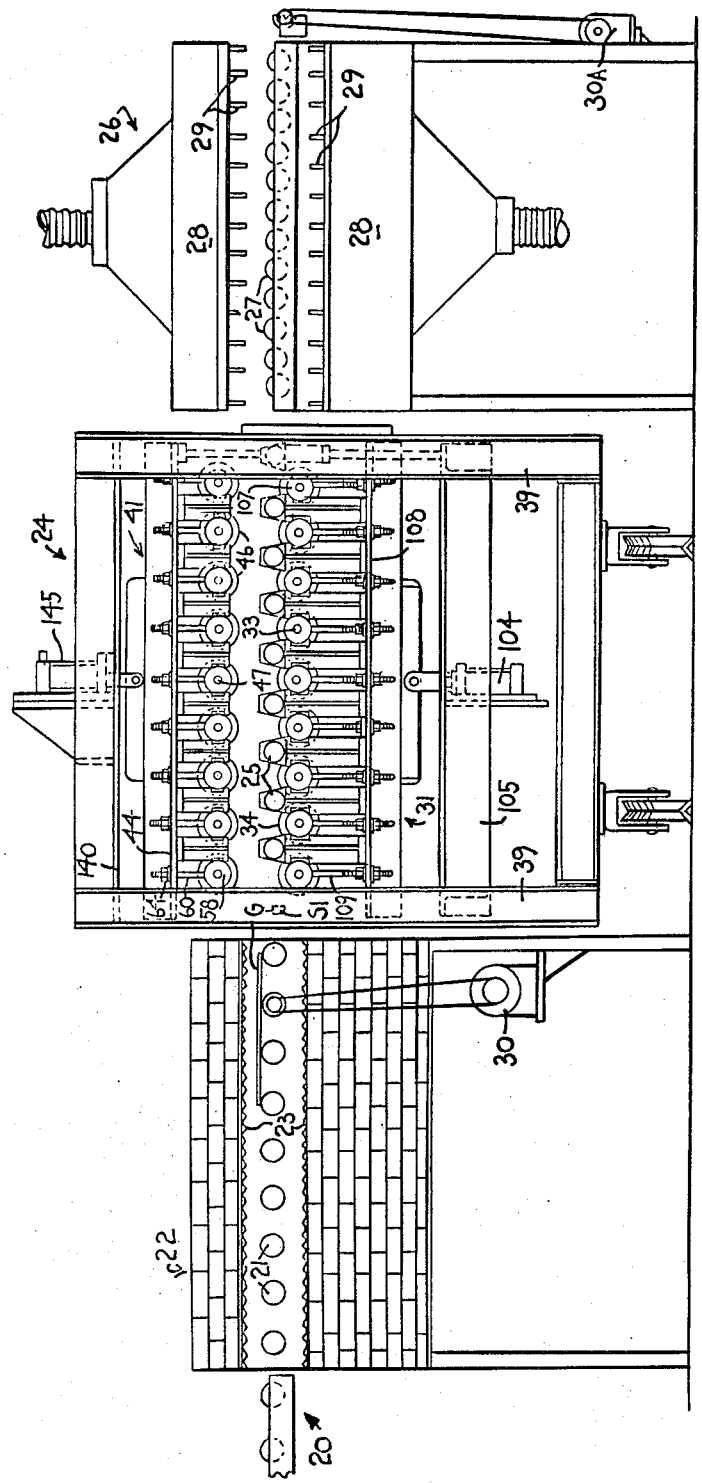
FIG. 11 is a partly schematic, longitudinal elevational view of apparatus conforming to a second embodiment of the present invention.
Figure 12:
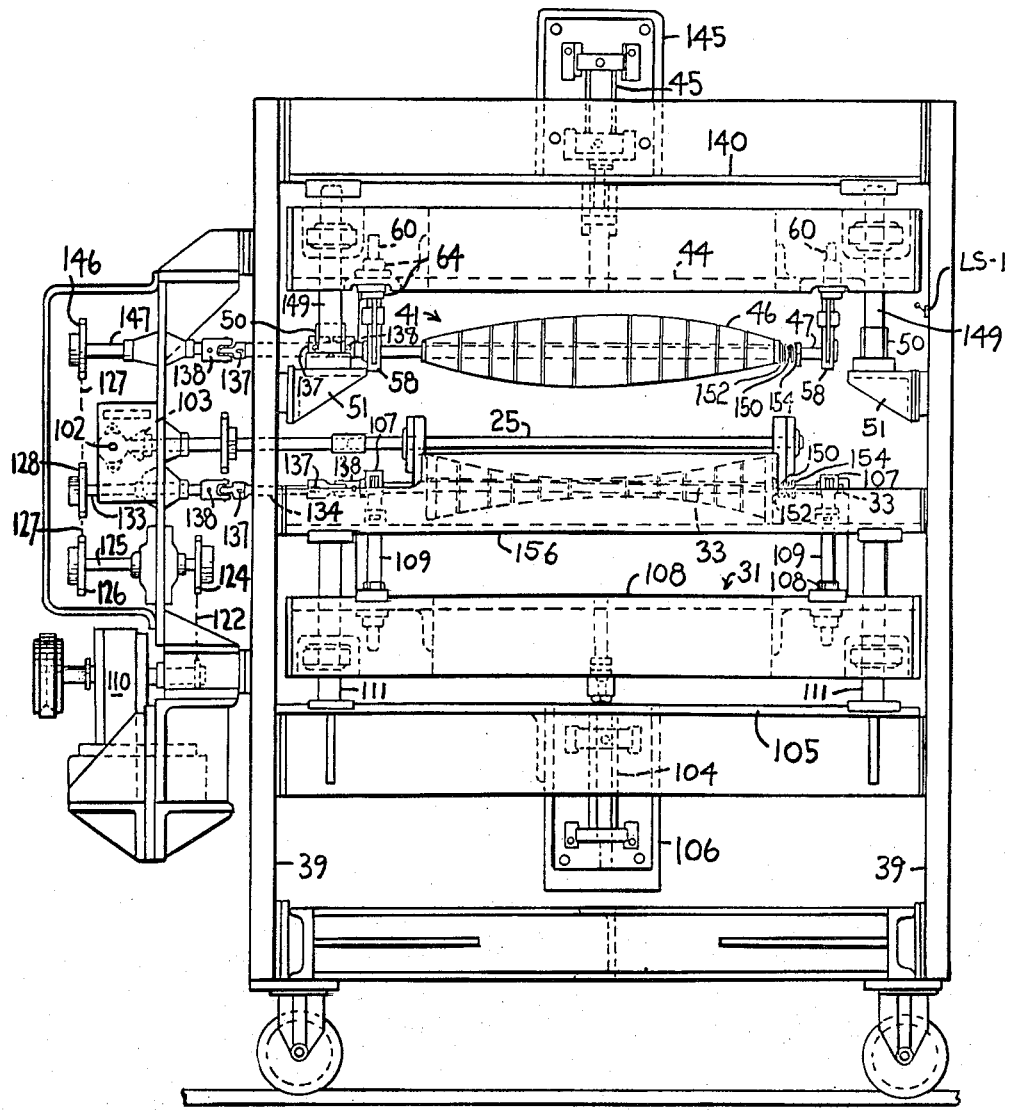
FIG. 12 is an enlarged, transverse view of the roll-type shaping station arranged as in FIG. 11 and forming part of the apparatus of FIG. 11.

Referring to FIGS. 4 and 10, the drive system for the upper segmented rolls 42 will be described. Starting with the drive shaft 33 on which sprocket 73 is fixed, another sprocket 90 is connected by a chain drive to other sprockets 90 on the other shafts 33 for the other lower segmented rolls 34 through guide sprockets 91 and idlers 92. Another sprocket 93 on the drive shaft 33 containing sprocket 90 drives a floating sprocket 94 on a common stub shaft 95 which also contain another sprocket 96. A pivoted weight arm 97 is fixed to the outer end of the common stub shaft 95 to hold down the sprockets 94 and 96 to insure tension in the respective chain drives. Sprocket 96 drives a sprocket 98 fixed to a shaft 47 for one of the upper segmented rolls 46. The remaining shafts 47 are driven in unison from the shaft 47 containing sprocket 98 through added sprockets 99 fixed to the other shafts 47 and end idler sprockets 100 through a chain drive 101.

Continuous operation of the first embodiment on a pilot plant scale succeeded in bending 12 inch square glass sheets into compound bends having 180 inch radii by 60 inch radii at a conveyor speed of 500 inches per minute. Triangular and notched pieces of glass were also formed satisfactorily on the roll pressing equipment described above.

In bending glass sheets to compound shapes, the position of the first shaft 33 supporting the first segmented shaping roll 34 to engage the bottom surface of one increment of a moving heat-softened glass sheet G and that of the corresponding first shaft 47 supporting the first segmented shaping roll 46 that simultaneously engages the upper surface of said one increment of said sheet G as the latter enters the press bending station 24 are adjusted as reference points and the shafts supporting successive segmented shaping rolls of each set are arranged downward along an arcuate path in the direction of glass movement corresponding to the shape desired for the component of the compound shape to be imparted to the glass sheets about an axis parallel to the shafts 33 and 47. This provides a series of lines of engagement along an arcuate downward path along which the glass moves during its compound bending. Preferably, the positions of the segmented rolls 34 and 46 are so adjusted that the last two rolls of each set form lines of common tangency that approximates a horizontal plane lower than that occupied by the common tangencies to the uppermost portions of the peripheries of rolls 21.

The rolls 27 that convey the bent glass sheets through the cooling station 26 are preferably aligned with the horizontal plane of the common tangency formed by the last two segmented rolls 46 in the lower roll housing. Drive tensioning means similar to those furnished in the shaping station and jack screws (not shown) to adjust the vertical position of the means supporting the brackets for the conveyor rolls 27 may be provided as is well known in the art without departing from the spirit of the invention.

The setting on the first timer is adjusted relative to the conveyor speed so that the shaping rolls are held in glass engaging position for a period of time approximately equal to the time needed for an increment to traverse the distance between adjacent opposing pairs of shaping rolls. This provides maximum glass shaping time possible and avoids introducing distortion resulting from changing the shape imparted by different rolls to the same increment of glass length.

It is understood that various changes may be made in the structure of the first embodiment described above. These include lifting the lower roll housing instead of or in addition to lowering the upper roll housing and/or arranging a set of convexly shaped segmented shaping rolls below a set of concavely-shaped segmented shaping rolls to impart to the glass sheets a dome shape rather than the illustrated dish shape in elevational cross-section. If the lower roll housing is lifted, the conveyor rolls 42 may be rigidly mounted in the same plane as the other conveyors rolls 21 and 27 in such a manner as to permit vertical movement of either the lower roll housing 31 or both housings 31 and 41.

Referring to FIGS. 11–19 of the drawings, a second embodiment is illustrated. Its main horizontal conveyor system comprises a first section including a series of horizontal stainless steel rolls 21 in the furnace 22 driven from a first drive motor 30 through conventional chain drives. Another motor 30A is coupled to a longitudinal drive shaft 102 (FIG. 12) and bevel gears 103 that are secured to the conveyor rolls 25 and 27. Usually, the motor 30A operates to rotate conveyor rolls 25 and 27 at greater peripheral speeds than conveyor rolls 21. For example, in processing glass sheets having a nominal thickness of $3/16$ inch (4.8 millimeters) rolls 21 convey the sheets at 400 inches per minute through the furnace 22 and conveyor rolls 25 and 27 convey the sheets at 600 inches per minute through the shaping station 24 and the cooling station 26. Suitable gear ratios are provided for the bevel gears 103 to insure equal peripheral speeds for rolls 25 and 27. Thus, a glass sheet entering the heating furnace 22 at the loading end thereof for press bending is transported at a fixed lower rate of speed through the furnace 22 and at a fixed higher rate of speed through the rest of the conveyor system.

When the glass sheets G are not press bent, the drive motor 30A is driven at an even higher speed. This accelerates the rotational speed of rolls 25 and 27 and reduces the time it takes for the glass sheets G to travel from the furnace 22 to the cooling station 26.

The novel press bending station 24 of the illustrative embodiment comprises a lower roll housing 31 rigidly supported by a vertical piston 104 in any of different positions determined by the extended or retracted position of the piston 104. A piston support platform 105 supports a housing 106 for piston 104. The lower roll housing 31 comprises a series of vertically adjustable support structures 107 arranged in a row spaced along the length of the portion of the conveyor system that traverses the shaping station 24 to receive the opposite axial ends of a series of straight, lower, common shafts 33 on which are mounted lower segmented pressing rolls 34, each comprising segments, 34a, 34b, 34c, 34d, 34e, 34f, 34g, 34h, 34i, 34j, and 34k of an asbestos cement sold by Johns-Manville under the trademark of Transite in the illustrative embodiment. A brass washer 135 having a thickness of $1/16$ inch and a diameter slightly less than that of the adjacent segments is disposed between each pair of adjacent segments. A spring 150 fixed to a thrust washer 152 at its inner end and bearing against a collar 154 fixed to shaft 33 at its outer end holds the segments in abutting relation along the shaft 33.

A base structure 108 is rigidly fixed to the upper end of the piston 104 for vertical movement therewith. Each support structure 107 can be adjusted vertically relative to base structure 108 by threaded adjustment shafts 109 connecting each of the adjustable support structures 107 and base structure 108. This vertical adjustment fixes the vertical position of each end of each lower shaft 33 independently. This independent adjustment provides the ability for the apparatus to impart compound curvatures as well as twisted shapes to moving glass sheets.

The piston support platform 105 and an additional reinforcing structure 156 interconnect posts 39. The piston support platform 105 has four apertures to receive vertical alignment posts 111 that keep the lower roll housing 31 aligned when piston 104 is actuated.

The vertical posts 39 also rigidly support an upper horizontal patform 140 relative to which an upper roll housing 41 is adjustably positioned vertically. The upper roll housing 41 comprises a movable platform 44. A piston 45 having a piston cylinder 145 supported on the upper horizontal platform 140 has its moving end attached to movable platform 44.

In vertical planes intermediate the vertical planes occupied by conveyor rolls 25 and in alignment with the vertical planes occupied by segmented shaping rolls 34 of the lower set is a set of upper segmented shaping rolls 46, each comprising a plurality of segments 46a, 46b, 46c, 45d, 46e, 46f, 46g, 46h, 46i, 46j and 47k mounted on a straight, upper, common shaft 47 for each upper shaping roll 46 in spring-loaded relation.

The rigid horizontal platform 140 supports four alignment posts 149 depending vertically downwardly to engage collars 50 attached to brackets 51 mounted on vertical posts 39 to insure proper alignment of the upper roll housing 41 when piston 45 is actuated.

The vertical position of each of the upper segmented rolls 46 is adjustable in a manner similar to the adjustments provided for the lower segmented rolls 34. For example, each upper shaft 47 is received rotatably in apertures in upper shaft brackets 58. The latter are rigidly connected at their upper ends to the lower ends of threaded rods 60. The latter extend upward through one or the other of a pair of apertures in the movable platform 44. Pairs of adjustment nuts 64 for each threaded rod, one nut mounted above the platform 44 and the other nut below the platform 44 determine the vertical position of each upper shaft 47.

Figure 15:
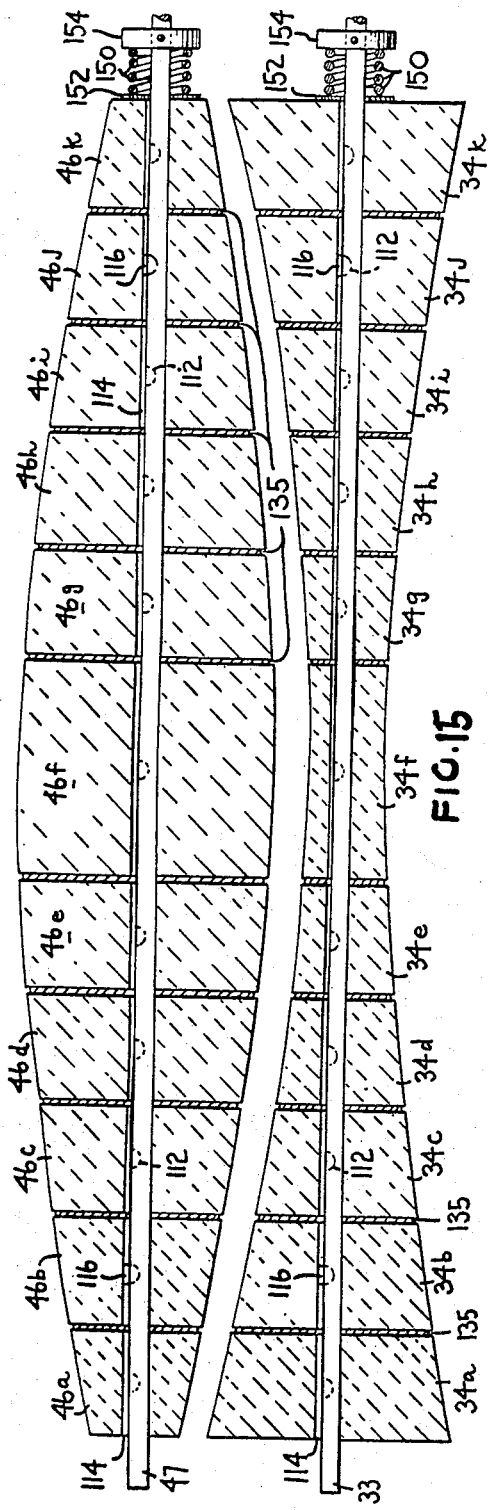
FIG. 15 is an enlarged transverse view of an opposed pair of press bending rolls showing details of their segmented construction.

As is best shown in FIG. 15, the segments 34a–34k of the lower segmented rolls 34 form a substantially continuous roll having a generally concave contour in the axial direction of their straight common shafts 33 conforming to the shape desired for an incremental portion of each glass sheet about an axis parallel to the path taken by the glass sheets treated. The segments 46a–46k of the upper segmented roll 46 have generally convex configurations that are complementary to the configurations of the lower roll segments they oppose. Hence, if all the upper segmented rolls 46 have their shafts 47 in horizontal alignment and the lower segmented rolls 34 have their shafts 33 in horizontal alignment, when piston 104 is extended, rolls 34, which support a hot glass sheet during its press bending at press bending station 24, are lifted to a horizontal plane above the positions occupied by the conveyor rolls 25 and the different increments of the moving glass sheet G are simultaneously engaged between different pairs of rotating shaped rolls to impose a transverse curvature on said sheet. The piston 45 retracts slightly to permit the lower segmented rolls 34 to transport the bent glass sheet into the cooling station 26 after only momentary contact as in the previous embodiment.

If the upper and lower shafts 47 and 33 are adjusted in a non-linear arrangement along similar arcuate lines, then the glass sheets can be bent into a compound curvature comprising a curved element about an axis parallel to the path and a curved element normal to said axis without impairing the smoothness of curvature of the glass sheet surface by limiting the duration of roll engagement as with the first embodiment. If the ends of the shafts 33 and 47 are disposed at different elevations for one or more shaped rolls, simultaneous and momentary engagement will develop a twisted shape in the glass.

Since the diameters of the segmented rolls vary along their axial length, if all the segments are keyed to rotate with the respective shafts 33 and 47, different segments would rotate at different peripheral speeds, thus tending to mark the glass during bending. The second embodiment also minimizes marking from this source by keying only a pair of symmetrically arranged segments, for example, segments 34b and 34j of the lower segmented shaping rolls 46, and permitting the other segments of the shaping rolls to be free running. The free running segments of segmented rolls 34 and 46 develop a peripheral speed equal to that of the moving glass sheet G as the latter is shaped during its conveyance through the press bending station 24.

Figure 14:
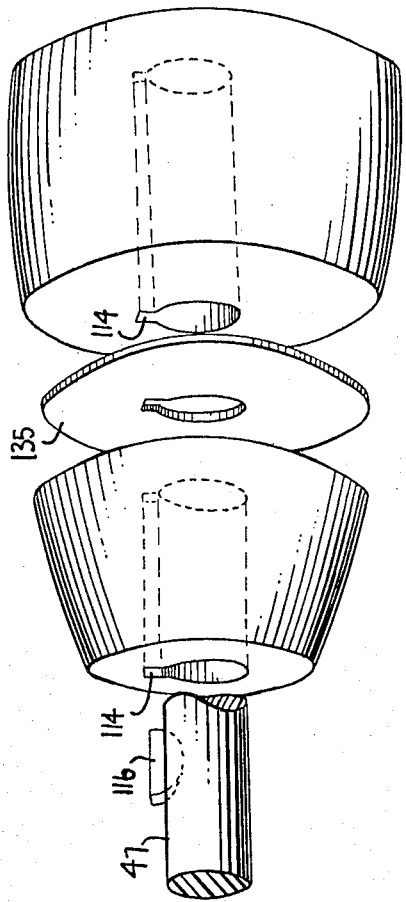
FIG. 14 is an exploded view of a portion of one of said press bending rolls.
Figure 13:
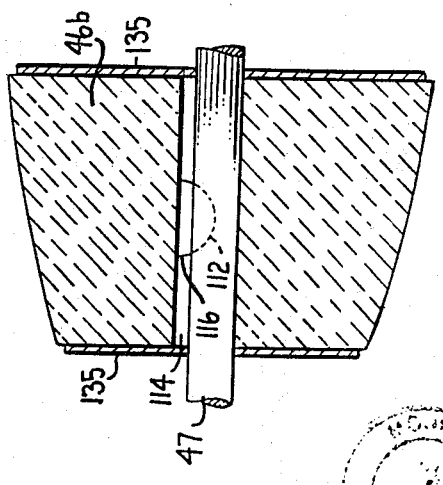
FIG. 13 is an enlarged detailed view of a portion of one of the press bending rolls forming part of the shaping station of FIG. 12.

FIGS. 13 to 15 show how each segmented roll 34 or 46 has selected segments thereof keyed to its associated shaft 33 or 47. Each shaft is provided with a series of spaced arcuate grooves 112. Each segment and washer 135 has a keyway 114 extending axially the entire axial length of the segment. A key 116 in the form of a semicircular disc is inserted into a selected groove 112 disposed in a position along the shaft 33 or 47 to be occupied by the segment selected to be driven. Thus, the keyways 114 allow the segments to be inserted or removed in axial direction despite the insertion of the key 116 in the grooves 112. Circumferentially, the orientation of a key segment is fixed to the shaft on which it is mounted. The unkeyed segments are free to rotate.

The segments selected to be keyed are preferably those in which the segment diameters of the opposing upper and lower segments are as nearly equal as possible. Such a selection minimizes surface marking of the treated glass.

The segmented rolls disposed on each shaft 47 and 33 may be readily replaced by sliding to remove one set and to install another set since the shafts are straight and it is only necessary to remove a bracket supporting one end of each shaft to effect removal and replacement. The segmented rolls supported on different pairs of opposed shafts may have different configuration if it is desired to produce very complicated shapes.

Figure 16:
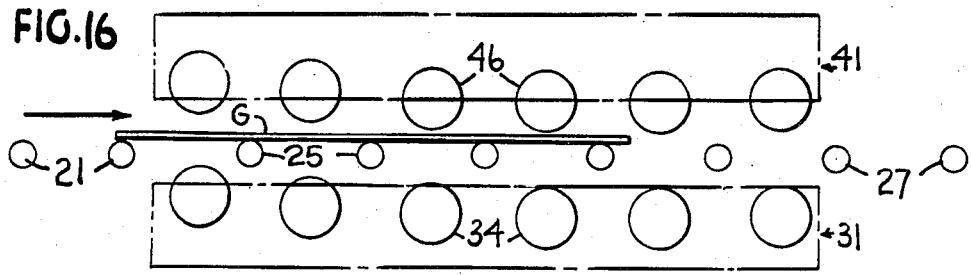
FIGS. 16, 17, 18 and 19 are fragmentary illustrative views showing the relative positions of the roll type press bending rolls of the second embodiment at different stages of a bending cycle; also showing how the individual positions of the press bending rolls are adjusted to produce compound bends.

FIGS. 16 to 19 show how the position of the roll housings is programmed during a typical roll pressing operation. In FIG. 16, a flat glass sheet G is shown having entered the shaping station 24 with its leading edge carried on rotating conveyor rolls 25 while the trailing edge is still carried by conveyor rolls 21. The upper roll housing 41 is retracted upward and the lower roll housing 31 is retracted downward to provide clearance between the surfaces of the glass sheets G on the one hand and the upper segmented rolls 46 and the lower segmented rolls 34 on the other hand.

As soon as the trailing edge of the glass sheet G passes over the last roll 21 before the press bending station 24, piston 45 begins to exand downward and piston 104 begins to extend upward to cause the lower segment rolls 34 to approach their respectively aligned upper segmented rolls 46 in a plane above the glass support plane provided by the conveyor rolls 25. A glass sensing device S–1 of the type well known in the art, such as a fluidic sensing device, is used to detect the passage of the trailing edge of the glass sheet G to initiate actuation of the movement of the pistons 45 and 104.

The upper platform 44 actuates a limit switch LS–1 when it reaches its lowest possible position. A first timer actuated by limits switch LS–1 determines how long the piston 45 remains in the downward rest position and a second timer also actuated by limit switch LS–1 is set for a longer period to control the time piston 104 remains extended. One of the posts 39 carries limit switch LS–1.

Figure 17:
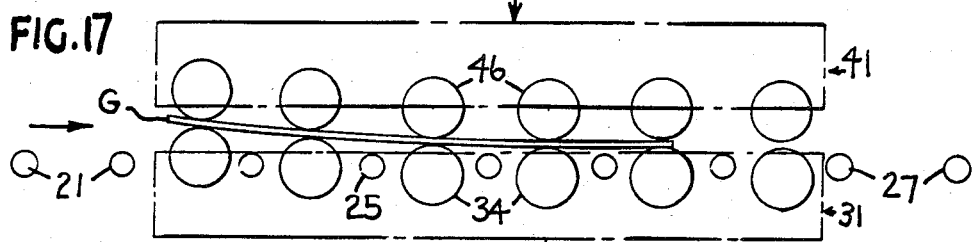

By the time the glass sheet G has reached the middle of the press bending station, the lower segmented rolls 34 have moved upward between conveyor rolls 25 to lift the sheet against the upper segmented rolls 46 and pressed the moving segments of the sheet upward against the upper segmented rolls 46. The latter, at the same time, have moved downward to a position above the level of the upper surfaces of the conveyor rolls 25 by a distance slightly greater than the glass sheets undergoing processing. Thus, the moving glass sheet is shaped while it moves between the sets of segmented rolls 46 and 34. This position is depicted in FIG. 17.

Figure 18:
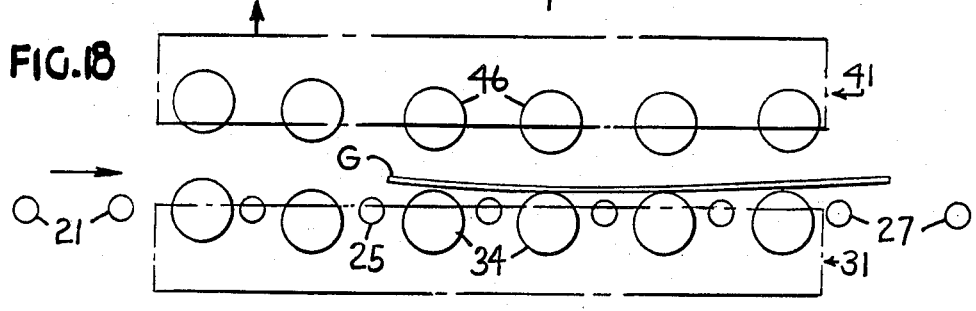

When the first timer actuated by limited switch LS–1 times out, piston 45 begins to retract, thus lifting the upper roll housing 41 toward its initial upwardly retracted position. The bent glass sheet G is free of any further contact against its upper surface while the segmented shaping rolls 34 propel the shaped glass sheet forward to the cooling station 26 as depicted in FIG. 18.

Figure 19:
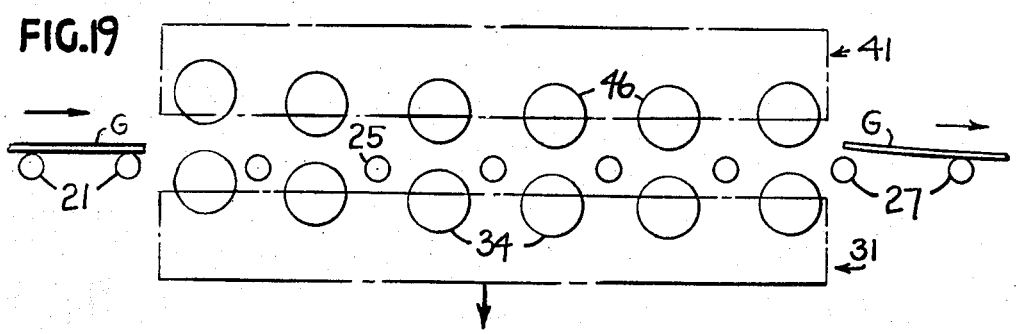
Figure 20:
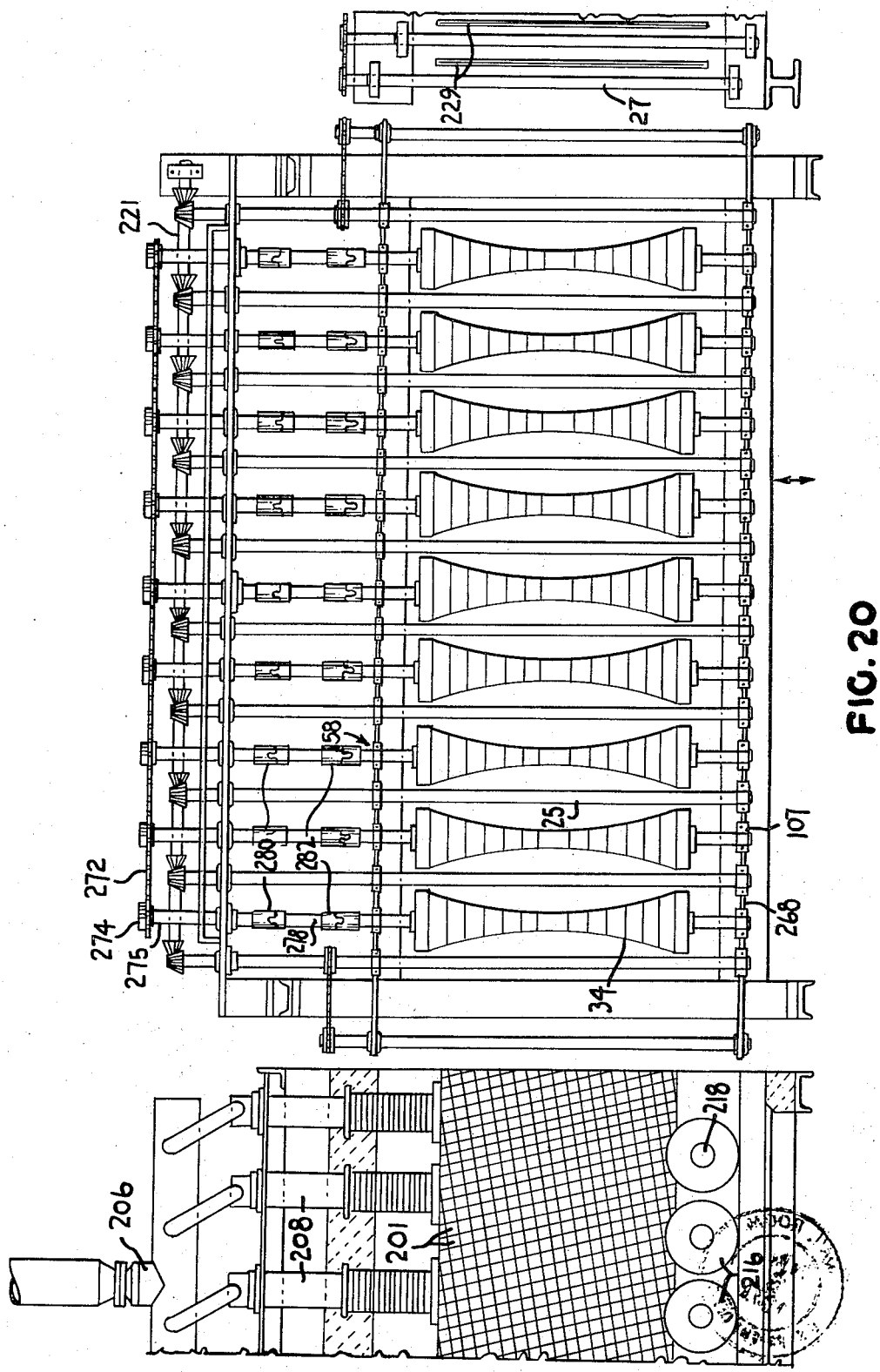
FIG. 20 is a horizontal sectional view of still a further embodiment of apparatus for shaping glass sheets by roll pressing incorporating a gaseous support type of conveyor for heating the glass preparatory to shaping.
Figure 21:
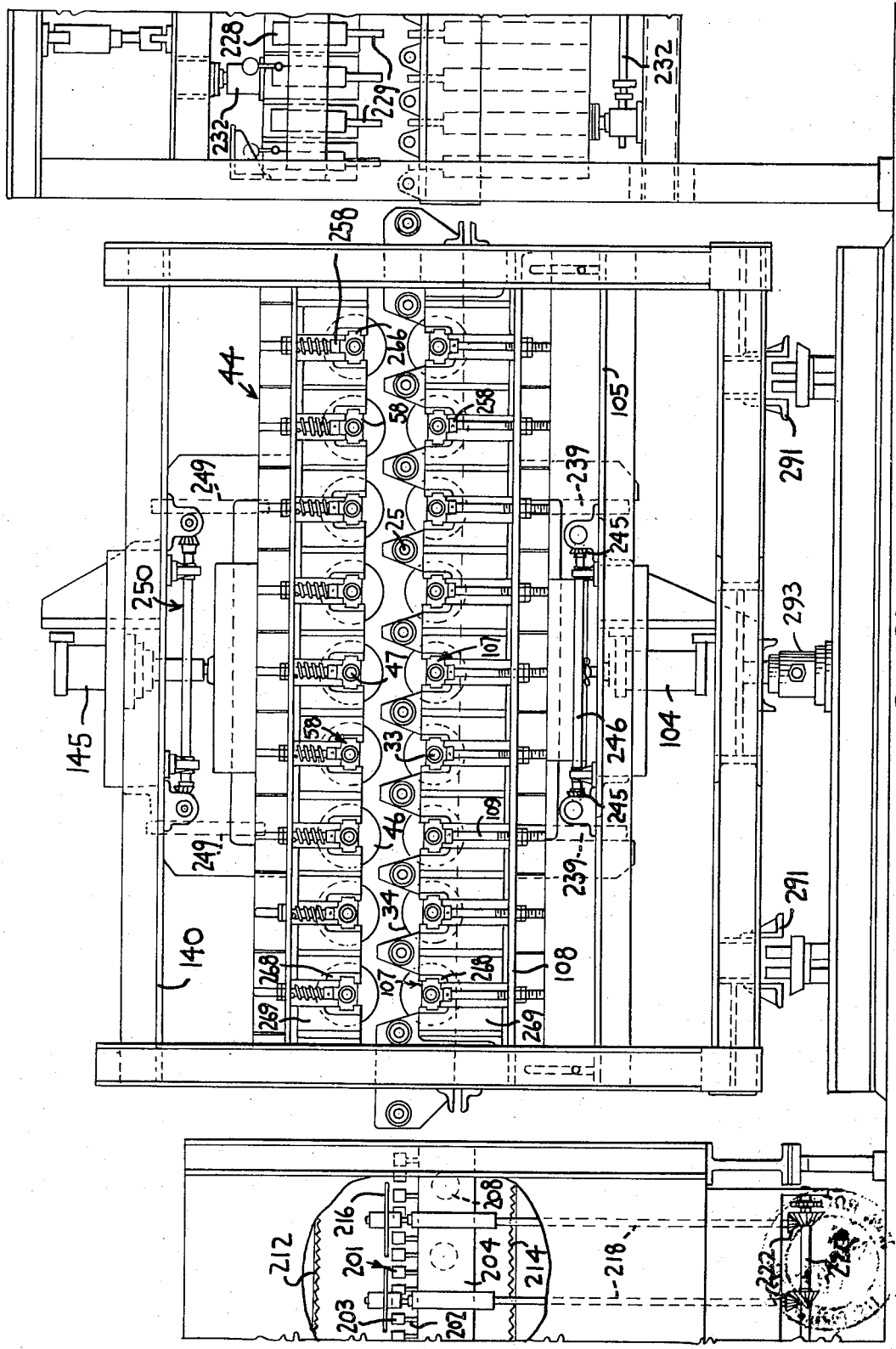
FIG. 21 is a longitudinal end view of the apparatus depicted in FIG. 20.
Figure 22:
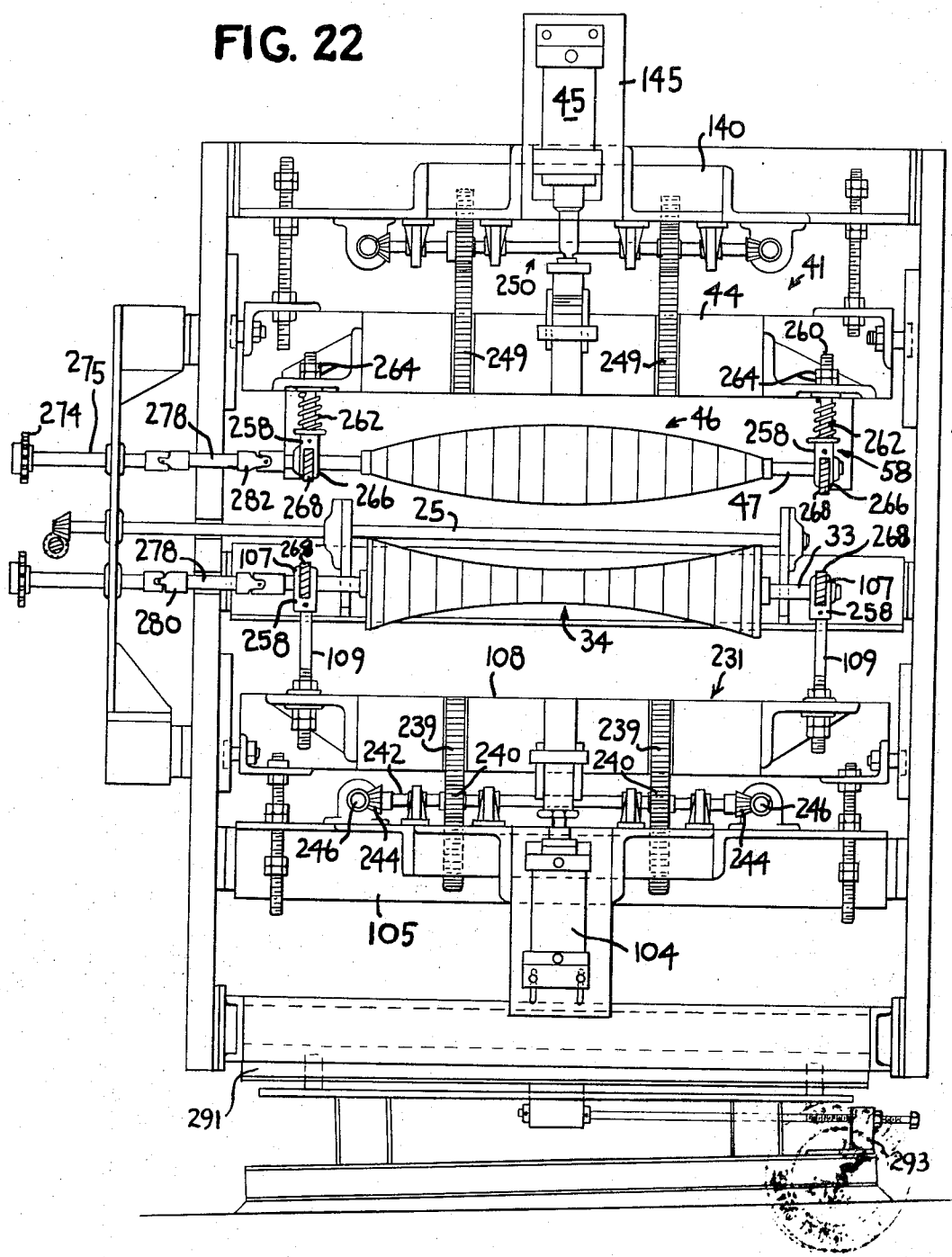
FIG. 22 is a view taken at right angles to the view of FIG. 21 showing a pair of rolls taken from the roll pressing apparatus.

When the trailing edge of the bent glass sheet G passes over the first roll 27, the second timer times out to enable the piston 104 to retract downwardly to lower segmented rolls 34 to planes below the horizontal plane occupied by rolls 25. The shaping station 24 is ready for its next cycle as shown in FIG. 19. A succession of glass sheets can be press bent withohut interrupting their forward movement through the shaping station 24.

Continuous operation on a pilot plant scale had succeeded in bending glass sheets 40 inches by 20 inches into compound bends having 1440 inch radii by 50 inch radii at a conveyor speed of 600 inches per minute. Triangular and notched pieces of glass were also formed satisfactorily on the roll pressing equipment of the second embodiment described above.

In bending glass sheets to compound shapes, the position of the first shaft 33 supporting the first segmented shaping roll 34 to engage the bottom surface of a moving heat-softened glass sheet G and that of the corresponding first shaft 47 supporting the first segmented shaping roll 46 that engages the upper surface of said sheet G as the latter enters the shaping station 24 are adjusted as reference points and the successive segmented shaping rolls of each set are arranged downward along an arcuate path in the direction of glass movement corresponding to the shape desired for the component of the compound shape to be imparted to the glass sheets about an axis parallel to the shafts 33 and 47. This provides a series of lines of engagement along an arcuate downward path along which the glass moves during its compound bending. Preferably, the positions of the segmented rolls 34 and 46 are so adjusted that the last two rolls of each set form lines of common tangency that approximates a horizontal plane occupied by the common tangencies to the uppermost portions of the peripheries of the conveyor rolls 27 of the cooling station 26.

The setting on the first timer is preferably adjusted relative to the conveyor speed so that the shaping rolls are held in glass engaging position for a period of time approximately equal to the time it takes for a segment to traverse the distance between adjacent shaping roll pairs. This provides optimum glass shaping time possible and voids introducing distortion resulting from changing the shape imparted by different rolls to the same increment of glass length. When the glass is bent to a simple shape about an axis parallel to the path of movement with no change in curvature from leading to trailing end, each increment may be engaged by more than one pair of opposing shaped rolls with only minor surface damage to the glass.

The keyed segments 34b and 34j of the lower roll housing 31 and the keyed segments 46b and 47j of the upper roll housing 41 are rotated through driving shafts 33 and 47, respectively at approximately the same peripheral speed as that of the conveyor rolls 25 in the press bending or shaping station 24. The keyed shaping roll segments rotate in fixed angular relation with driving shafts 33 and 47 through a drive system to be described immediately below.

A variable speed drive motor 110 comprises the motive force for the drive system to rotate the shaping roll segments that are keyed to driving shafts 33 and 47. The motor 110 acts through a driving chain 122 to rotate a sprocket 124 on a stub shaft 125.

Shaft 125 has another sprocket 126 that drives another chain drive 127 that rotates a series of sprockets 128, which are fixed on the end of each of a series of lower drive shafts 133. Each of the latter drive shafts is coupled to one or another of the lower shafts 33 for driving the segmented lower shaping rolls 34. The coupling comprises a driving link 134. A slip joint 137 and a universal joint 138 is at each end of said driving link to provide a continuing driving connection between each drive shaft 133 and shaft 33 whenever the latter set of shafts moves vertically with respect to the plane of support for the drive shafts 133.

Chain drive 127 also couples a sprocket 146 to the driving sprocket 126 of motor 110. Sprocket 146 is fixed to an upper drive shaft 147 that is coupled to the drive shaft 47 for segmented rolls 46 by another driving link 134 that is provided with a slip joint 137 and a universal joint 138 at each end. Thus, both roll housings 31 and 41 can move vertically without impairing the driving connections between the driving shaft 133 and lower shaft 33 and between the driving shaft 147 and upper shaft 47.

Referring to FIGS. 20 to 24, a third embodiment of the invention is illustrated. This embodiment shows a heated furnace of gas hearth type, which may be used to replace either the entire furnace or the hot end only of the roller hearth type of furnace described as forming part of the previous two embodiments. In a gaseous hearth system, such as the one used in the third embodiment which is based on apparatus depicted in U.S. Pat. No. 3,233,501 to James C. Fredley et al., the furnace is provided with a flat bed formed of a series of modules 201 in spaced but close juxtaposition to each other and arranged geometrically like a mosaic. Each module has an upper terminus of rectangular configuration. The upper termini lay in a common plane that is obliquely arranged at an angle of five degrees to the horizontal transversely of the bed and that extends horizontally lengthwise of the bed.

The modules 201 are arranged in successive rows crossing the path of travel intended for glass sheets undergoing treatment, each row being at an oblique angle of about ten degrees to the path taken by the glass sheets. Each row is spaced close to the next adjacent row. Each module 201 has a relatively narrow stem 202 of similar cross-sectional area to that of the upper terminus and each opens up into a module plenum chamber 203, positioned below the bed and acting as a support for the bed.

Each module is substantially enclosed and spaced from adjacent modules by an exhaust zone. The bed is adjusted to such a level that the plane of the upper termini of the modules lies parallel to, but just below a plane defined by the upper surface of the conveyor rolls 25 of the shaping station 24.

The narrow stems 202 are in communication with an elongated plenum chamber 204 which receives hot gas from a series of gas burners 206 through conduits 208. Conventional electric heating elements 212 and 214 are disposed above and below the elongated plenum chamber 204. Hot gas is supplied to the elongated plenum chamber 204 under pressure for delivery through the individual modules 201 to provide a hot gaseous bed on which glass sheets are supported in an oblique almost horizontal plane while they are heated to a temperature sufficient for deformation.

The glass sheets are engaged along their lower side edges only by means of a series of driving discs 216 disposed in a series along the lower side edge of the bed. Each of the driving discs 216 is mounted on a different rotating shaft 218 of a series of shafts connected to a main drive shaft 220 through suitable bevel gears 222. The discs rotate in unison to propel a series of glass sheets along the length of the gaseous bed toward the shaping station 24.

The shaping station 24 of this embodiment is similar to that of the previous embodiments. However, the upper common tangential plane for the conveyor rolls 25 in the shaping station 24 is disposed in a plane forming an extension of the oblique plane of support provided by the gaseous bed formed by the array of modules 201 in the furnace. In addition, the upper brackets 58 are spring loaded at each end and both the upper shafts 47 and lower shafts 33, which support the segmented pressing rolls, are in turn mounted on respective brackets 58 and 107 in such a manner that the brackets are readily disengaged from the ends of the roll supporting shafts, particularly at the ends opposite the ends driven through flexible couplings. This structure facilitates ready removal of a segmented roll having one configuration and substitution of a segmented roll having a different configuration whenever production requirements necessitate a change in production pattern.

The alignment mechanism for this embodiment comprises four vertical racks 239 extending vertically downward from the base structure 108 supporting the lower roll housing 31. Each rack 239 is geared to a gear 240 mounted for rotation with one of a pair of parallel elongated gear support rods 242. Bevel gears 244 at the ends of the rods 242 mesh with bevel gears 245 at the ends of interconnecting rods 246 to provide a rectangular array of gear driven rods rotatably mounted in brackets fixed to the upper surface of the piston support platform 105 to assure that all four racks 239 move equal vertical distances relative to the piston support platform 105, thus assuring that the base structure 108 and its attached lower shaft support brackets 107 move in a proper direction and distance in response to extension or retraction of the piston 104.

A similar arrangement of racks 249 attached at their lower ends to the movable platform 44 for the upper roll housing 41 is provided with a rectangular array of rods and gears depicted by reference number 250 supported to the bottom surface of the fixed upper horizontal platform 140 to insure proper alignment of the upper segmented shaped rolls 46 when the upper set of rolls 46 is moved in unison in response to actuation by piston 45.

Another variation from the structure of the other embodiments is resilient means that allows the upper shaft brackets 58 which rotatably support the ends of the straight upper common shafts 47 for the upper segmented rolls 46 to yield upward from their positions established by the adjusted lengths of the threaded rods 260 that extend downward from the upper movable platform 44. Resilience is supplied for the threaded adjustment rods 260 with springs 262 that surround the rods 260 between the brackets 58 and the upper movable platform 44. The adjustment nuts 264 are both mounted above apertured horizontal flanges carried by the movable platform 44 to establish the lowest position possible for the upper segmented shaping rolls 46. The spring loading causes the upper rolls 46 to yield slightly in the event the thickness of a glass sheet is greater than the distance of separation between the upper segmented shaping rolls 46 and segmented rolls 34 when a leading edge of a glass sheet enters between an opposing pair of rolls in the glass engaging position. The springs 262 are preferably made of spring steel and are constructed to have a yieldability of one inch per 25 pounds of load. This yieldability imparted to the upper roll reduces the incidence of chipping along the leading edge of the glass sheets.

It is understood that the various modifications which are suggested for the various embodiments may be combined with any of the embodiments of the elements of the other embodiments.

As in the second embodiment, separate drives are provided for the conveyor rolls 25 and for the shaping rolls 34 and 46. The drive system for the shaping rolls 34 and 46 is similar to that of the second embodiment and comprises a driving chain 272 which rotates a series of sprockets 274 each mounted on a separate stub shaft 275. Each of the stub shafts 275 drives one of the lower shafts 33 or one of the upper shafts 47 through a flexible coupling that enables one to pivot each shaft 33 or 47 whenever the outer bracket 58 or 107 is disconnected from the shaft. The flexible coupling comprises a driving link 278 interconnecting a pair of universal joints 280 and 282. The conveyor rolls 25 are geared to the conveyor drive shaft 221 driven by a special motor for the conveyor in the shaping station carried by a base member of a frame structure which supports the shaping station 24.

To facilitate replacement of one segmented roll with another segmented roll, each bracket 58 or 107 comprises a bearing housing having an apertured collar 258 extending away from the opposite set of shaping rolls. The apertures in the apertured collars are alignable with apertures in respective threaded shafts 109 and 260 to receive a split spring-loaded roll pin. In addition, each bracket 58 and 107 has a pair of bifurcated extensions 266 extending laterally of the bearing housing to make sliding fit with tongues 268 carried by spaced end vertical wall members 269 of movable platforms 44 and 108.

In order to maintain the glass sheets in proper alignment after they have been delivered from the furnace to the roll conveyor, special segmented collars 284 are mounted around some of the conveyor rolls 25. The collars are provided with two hemispheres 286 and 288 (FIG. 24) with extensions 289 extended from the hemisphere 286 to fit into recessed sockets 290 of the hemisphere 288. In this manner, it is possible to fit a donut shaped roll onto each conveyor roll 25 wherever desired. In addition, the entire shaping station 24 is mounted on transverse guides 291 to facilitate transverse movement by crank means 293 so that the longitudinal center line of shaping station 24 is aligned with the longitudinal centerline of the glass in the furnace 22.

In the third embodiment of the invention, the cooling air is delivered through upper and lower nozzle boxes 228 which terminate in nozzles 229 having arcuate openings conforming to the shape of glass sheets conveyed through the cooling station. A skeleton structure 230 is adjustable in position by adjusting means 232 to a main frame 234. The nozzle boxes are supported at an oblique angle transverse to the path of glass sheets through the cooling station 26. Air under pressure is supplied through flexible conduits 236 to the nozzle boxes in a generally downward direction.

Split collars 284 may be used in the shaping station 24 to guide the edge of the glass sheet that has been in contact with the rotating driving discs 216 in the gas hearth furnace. In the cooling station, similar split collars 284 are provided to support the under surface of the bent glass sheets while they are conveyed through the cooling station 26. Preferably, the split collars are made of a material that does not harm or mar hot glass on contact therewith and preferably is made of pressed asbestos-like material identical to that used for the shaping roll segments in the shaping station 24. Each split collar 284 comprises a pair of interfitting hemispherical sections 286 and 288, as previously described.

Figure 23:
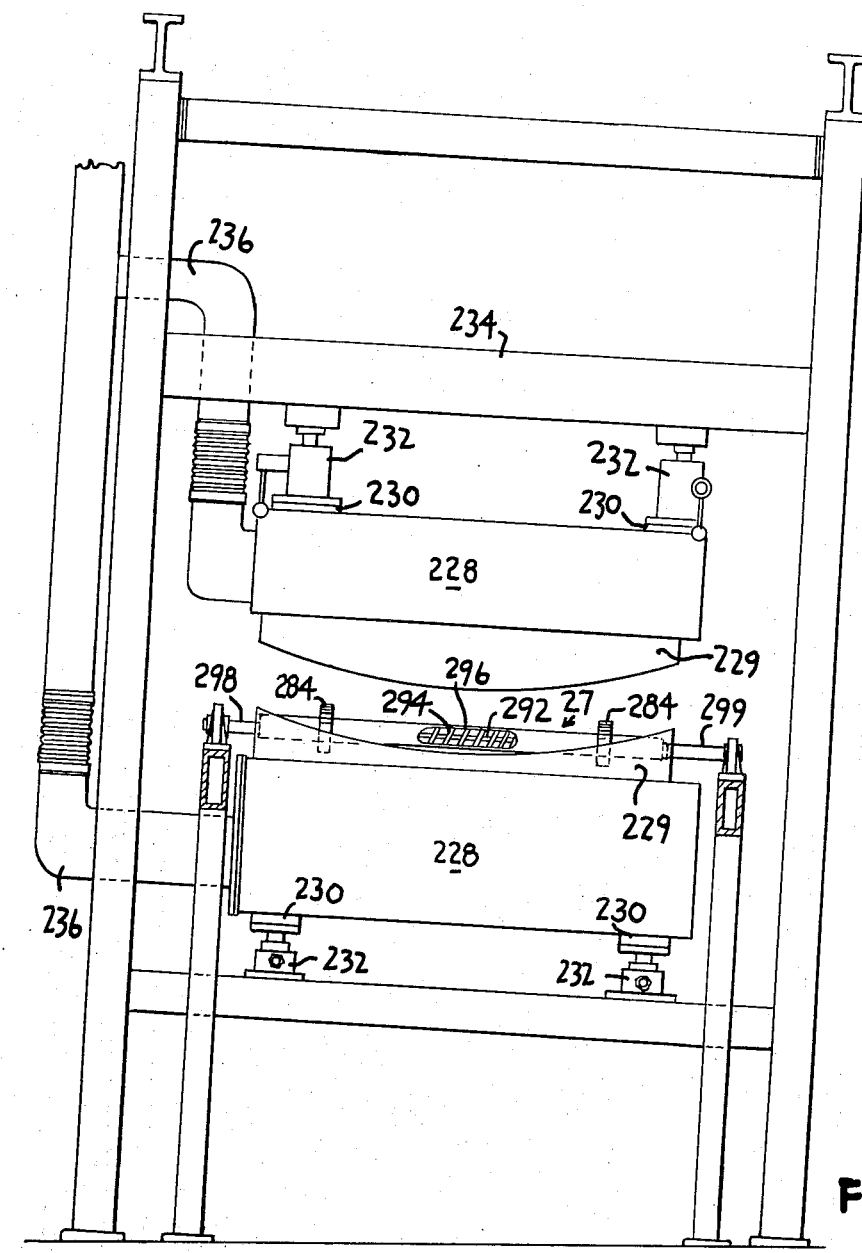
FIG. 23 is an end view of the cooling station taken at right angles to the view of FIG. 21.
Figure 24:
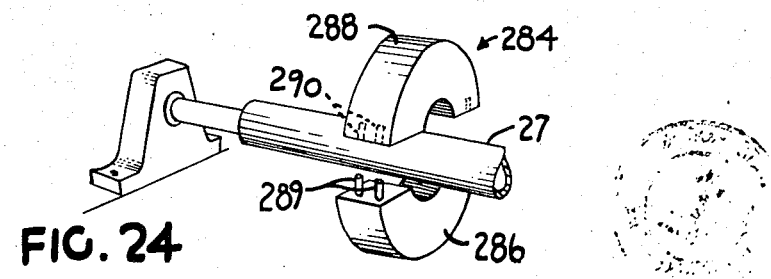
FIG. 24 is a partially exploded view of a donut type roll used to convey bent glass sheets through the cooling station.

With further reference to FIG. 23, a conveyor roll 27 useful in the cooling station 26 is illustrated. The roll comprises a thin main drive shaft 292 surrounded by a compression spring 294 and a fiberglass sleeve 296 mounted about the spring 294. The rod 292 extends between and is rigidly connected between the inner end of a stub roll 298 and the inner end of another stub roll 299. One of the stub rolls is directly connected to a conveyor drive system for the cooling station 26 and the other stub roll is driven with the first stub roll through the thin rod 292.

A pair of split collars 284 may be mounted about the rolls 27. The positions of the collars 284 along the shafts 292 are so chosen that the bent glass passing through the cooling station is capable of being supported with spaced portions near its ends resting on the collars 284 and the intermediate portion making contact with the intermediate portion of the fiberglass sleeve 296.

The spring 294 is mounted about the rod 292 with sufficient clearance to permit the spring to yield when supporting sharply bent sheets, thus permitting the roll to adjust its surface for different shapes of glass that are conveyed through the cooling station 26.

In typical operations, glass sheets are conveyed through the furnace of the gas hearth type so that they arrive at the furnace exit at a temperature ranging between 1220° F. and 1250° F. The speed in the furnace may be anywhere between 300 to 600 inches per minute, for example. The speed through the shaping station 24 and the cooling station 26 is 600 inches per minute. With rolls spaced 8 inches from center to center, the glass sheets passing through the shaping station 24 are held in pressurized engagement between the upper and lower segmented rolls for about 0.6 to one second.

If the glass sheets are to be shaped to more complicated bends, such as bends having different radii of curvature along different longitudinally spaced increments of the sheet, it is preferred to have the shaping rolls engage different glass increments simultaneously for the exact time needed for the glass to traverse the space between adjacent pairs of rolls in the roll shaping apparatus. This is important so that the shape impressed on the one increment is not pressed out of the glass when the increment moves to a position between a subsequent pair of rolls. However, when the glass is subjected to a simple curve, such as one having a uniform shape from its leading edge to its trailing edge in the direction of glass sheet movement, it is possible to permit the glass to remain in engagement between two or even three pairs of rolls. However, it is preferred to minimize the period of pressure engagement of the glass between the opposing rolls of each pair to an absolute minimum needed to impart the desired configuration. The apparatus is capable of shaping glass sheets having a thickness from approximately .090 inch and less to approximately .250 inch and more.

The nozzles in the cooling station 26 are held in vertical alignment with one another at a vertical distance of about 5 to 6 inches from nozzle to nozzle with the glass approximately midway between the nozzle openings and the nozzles having 3/16 wide slots spaced at four inches center to center with the conveyor rolls of one inch diameter disposed centrally of the space between adjacent pairs of opposing nozzle slots. Air supplied at a pressure of 16 ounces per square inch has been found to provide acceptable cooling for shaped glass sheets .150 inch thick after 7 to 10 seconds of cooling. Apparatus has been used to shape glass and cool glass having a size ranging in shaped glass sheet from 12 inches by 18 inches to 27 inches by 45 inches and bigger.

The apparatus has bent glass sheets to uniform radius shapes of 43 inch radius to 60 inch radius about an axis extending parallel to the path of movement of the glass sheets through the shaping station, and has shaped glass to compound shape wherein a bend of 50 inch radius about an axis extending parallel to the path of movement was combined with a bend of 1440 inch radius about an axis normal to the path of movement. The apparatus can also shape glass to a complex compound bend by mounting shafts supporting certain pairs of shaped rolls about axes tilted with respect to other rolls in spaced vertical planes to impart a twist to the moving glass sheets in turn combined with the simple or compound curvatures provided from previously described arrangements. Furthermore, the apparatus has been used to shape glass sheets to a complex shape wherein the radius of curvature varies from one end to the other of the glass sheet in a direction parallel to the path of movement by mounting a pair of opposing shaping rolls having a radius of curvature of 60 inches engaging the leading edge portion of the glass while a pair of opposing shaping rolls having 40 inches radius of curvature engage the trailing edge portion and intermediate pairs of opposed shaping rolls are provided with intermediate radii of curvature to simultaneously engage intermediate longitudinal increments of the glass sheets. This latter complicated shape can also be combined with the other variations in supporting the ends of the shafts to provide even more complicated shapes.

Glass sheets 24 inches long, 20 inches wide and 3/16 inch thick have been shaped to a curvature of 20 inch radius at one side to 60 inch radius at the other side by engaging the glass sheets between rotating rolls whose radii change in a direction normal to the glass path. This variation may also be combined with the variations described above.

It is preferred, although not absolutely necessary, that the axial length of each segment be no more than approximately two inches except for the central segments which may be as much as four inches in length. Limiting the segment lengths causes minimum surface marking of the glass passing through the shaping station, because differences in peripheral speed of different portions of a segment or of different segments would otherwise impart scuff marks to the surface of the glass.

Various embodiments of roll pressing apparatus have been described for purposes of illustrating the present invention. It is understood that various changes may be made such as in materials used and other obvious modifications without departing from the spirit of the invention defined in the claimed subject matter that follows.

The important aspect of the present invention is the simultaneous pressurized engagement of different longitudinally spaced increments of glass sheets by opposed pairs of rolls of complementary configuration for the briefest interval necessary to produce a shape conforming to the roll shape to each moving increment of the moving glass sheets as simultaneously as possible, and discontinuing the pressurized engagement of the rolls before a substantial portion of the length of the glass passes between any pair of opposing rolls for pressure engagement or before any longitudinal increment of glass passes between opposing pairs of rolls having substantially different shapes from the pair initially providing pressurized engagement against the particular longitudinal increment.

While all the embodiments described above require that at least one of the segments of each segmented shaping roll be positively driven, it is also possible to provide a separate drive mechanism such as a retractable pushing means that would drive the glass between shaping rolls comprising freely rotating segments without requiring a driven segment.

Many other variations become obvious in the light of the above disclosure without departing from the spirit of the present invention as defined by the claimed subject matter that follows.

I claim:

1. Apparatus for shaping a glass sheet while the latter moves in a given path comprising a first set of spaced, straight shafts, a roll mounted on each of said first set of straight shafts having a curved shape in the direction of the axis of the shaft on which it is mounted and disposed to one side of said path, a second set of spaced, straight shafts, a shaped roll mounted on each of said second set of straight shafts, each roll of said first set being aligned with a correspond roll of said second set to form a pair of opposing shaped rolls, each roll of said first set having a curvature complementary to that of said corresponding opposing shaped roll of said second set, a common housing supporting each set of shafts for moving said shafts in unison, and means for moving at least one of said housings relative to the other of said housings between a retracted position, wherein said sets of rolls are disposed on opposite sides of said path and the rolls of said first set are separated from corresponding rolls of said second set by a distance greater than the thickness of glass sheets undergoing treatment, and a closed position, wherein said sets of shaped rolls engage the opposite surfaces of a heat-softened glass sheet on one side of said path in rolling pressurized engagement as said sheet moves between said sets of shaped rolls, whereby longitudinally spaced increments of said glass sheet are simultaneously shaped by said pairs of opposed shaped rolls when said housings occupy said closed position.

2. Apparatus as in claim 1, wherein the shafts of said first set are mounted in a first plane and said shafts of said second set are mounted in a second plane parallel to said first plane.

3. Apparatus as in claim 1, wherein the shafts of said first set are mounted along a first curved surface and said shafts of said second set are mounted along a second curved surface parallel to said first curved surface.

4. Apparatus as in claim 1, wherein at least one of said pairs of opposing shaped rolls has a shape of different curvature from that of another of said pairs of opposing shaped rolls.

5. Apparatus as in claim 1, wherein said shaped rolls are segmented.

6. Apparatus as in claim 5, wherein at least one of the segments of at least one of said segmented rolls is drivingly connected to its associated shaft for rotation therewith.

7. Apparatus for shaping a glass sheet as in claim 1, further comprising a furnace, a shaping station and a cooling station intersected by said path wherein said sets of shaped rolls are composed of refractory material segments.

8. Apparatus as in claim 1, further including a conveyor having a succession of spaced conveyor rolls mounted along said path and spaced a sufficient distance from one another to provide clearance for moving one of said sets of spaced shafts rotatably supporting its associated shaped rolls in paths transverse to said path between said spaced conveyor rolls when said common housing supporting said shafts moves between said retracted position and said closed position.

9. Apparatus as in claim 8, wherein each of said shaped rolls is segmented and at least one segment of at least one of said shaped rolls is drivingly connected to its associated shaft for rotation at approximately the same peripheral speed as the peripheral speed of said spaced conveyor rolls, the remaining segments of said shaped rolls being free running.

10. Apparatus as in claim 5, wherein each of said common housings comprises means for adjusting the position of each of said straight shafts supporting said shaped rolls to adjust the shape to be imparted to said different increments of glass sheet transverse to the axes of said shafts rotatably supporting said shaped rolls.

11. Apparatus as in claim 8, wherein said glass engaging surfaces of said conveyor rolls are located in a common horizontal plane, one of said sets of shaped rolls is disposed above said common horizontal plane, and all the shaped rolls of said other of said sets of shaped rolls are below said common horizontal plane in the retracted position and the glass engaging surfaces of both sets of shaped rolls are all above said common horizontal plane in the closed position.

12. Apparatus as in claim 11, including a pair of axially spaced brackets for rotatably supporting each of said shafts, means for adjusting the vertical position of each of said brackets and resilient means operatively connected to each of said brackets supporting said shafts on which said upper set of shaped rolls is mounted to permit upward yielding movement for each of said upper set of shaped rolls from the position determined by the adjusted vertical position of said brackets.

13. Apparatus as in claim 11, wherein said shaped rolls of said set of rolls disposed above said common horizontal plane are convexly curved and said shaped rolls of said other set of rolls are concavely curved.

14. Apparatus as in claim 11, wherein said shaped rolls of said set of rolls disposed above said common horizontal plane are concavely curved and said shaped rolls of said other set of rolls are convexly curved.

15. Apparatus as in claim 11, wherein said conveyor rolls are located in a common horizontal plane, further including means for supporting one of said sets of shaped rolls above said common horizontal plane and the other of said sets of shaped rolls below said common horizontal plane so that said apparatus may also process flat glass sheets without imparting a shape to said glass sheet by press bending.

16. Apparatus as in claim 8, wherein said conveyor comprises a furnace section including a gaseous bed for supporting said glass sheet during conveyance therethrough.

17. Apparatus as in claim 16, wherein said furnace section comprises means for engaging an edge of said glass sheet to propel said sheet through said furnace while supported on said gaseous bed.

18. Apparatus as in claim 17, further including a shaping station and means to adjust the position of said shaping station in a direction transverse to said path to align said sets of shaped rolls with the portion of said path taken by said glass sheets when traversing said furnace section.

19. Apparatus as in claim 1, further including a bracket for supporting each of said shafts, and means permitting ready disassembly of said bracket from said shaft to permit removal of a roll of one shape from said shaft and its replacement with another roll of a different shape onto said shaft.

20. Apparatus for press bending a glass sheet comprising a first set of spaced, segmented rolls having a series of axially aligned segments whose outer surfaces are curved in the direction of the associated roll axis disposed to one side of a given path, a second set of spaced, segmented rolls having a series of axially aligned segments whose outer surfaces are curved in the direction of the associated roll axis, each roll of said first set being aligned with a corresponding roll of said second set, each roll of said first set having a curvature complementary to that of said corresponding shaped roll of said second set, a common housing supporting each set of rolls, and means for moving at least one of said housings relative to the other of said housings between a retracted position wherein the rolls of said first set are separated from corresponding rolls of said second set by a distance greater than the thickness of glass sheets undergoing press bending and a closed position wherein said sets of shaped rolls engage the opposite surfaces of a heat-softened glass sheet at longitudinally spaced moving portions thereof as said sheet moves between said sets of rolls.

21. Apparatus for press bending a glass sheet as in claim 20, further comprising a conveyor having a succession of spaced conveyor rolls mounted along a predetermined path for driving said glass sheet therealong, a furnace, a press bending station and a cooling station intersected by said predetermined path, means for moving at least one of said sets of spaced, shaped, segmented rolls in paths in planes transverse to said predetermined path between a retracted position wherein said sets of shaped rolls are disposed on opposite sides of said predetermined path to a glass sheet engaging position wherein said sets of shaped rolls are disposed on the same side of said predetermined path.

22. Apparatus as in claim 20, further including a succession of spaced conveyor rolls mounted along said predetermined path and spaced a sufficient distance from one another to provide clearance for moving said rolls comprising one of said sets of spaced, shaped rolls in said paths normal to said predetermined path between said spaced rolls between said retracted position and said glass engaging position.

23. Apparatus as in claim 20, wherein at least one segment of at least one of said shaped rolls is driven at approximately the same peripheral speed as the peripheral speed of said spaced conveyor rolls, the remaining sections of said shaped rolls being free running.

24. Apparatus as in claim 22, wherein said conveyor rolls are located in a common horizontal plane, the glass engaging surfaces of the upper one of said sets of shaped rolls are disposed above said common horizontal plane and the glass engaging surfaces of the lower of said sets of shaped rolls are disposed below said common horizontal plane in the retracted position and the glass engaging surfaces of both sets of shaped rolls are all above said common horizontal plane in the closed position.

25. Apparatus as in claim 24, wherein said shaped rolls of said set of rolls disposed above said common horizontal plane are convexly curved and said shaped rolls of said other set of rolls are concavely curved.

26. Apparatus as in claim 24 wherein said shaped rolls of said set of rolls disposed above said common horizontal plane are concavely curved and said shaped rolls of said other set of rolls are convexly curved.

27. Apparatus as in claim 24, further including means for adjusting the vertical position of each end portion of each of said segmented shaped rolls.

28. Apparatus as in claim 27, further including resilient means operatively connected to each of said shaped, segmented rolls of said upper set of rolls to permit upward yielding movement for each of said upper set of shaped rolls from its position determined by the adjusted vertical position of said vertical position adjusting means.

29. In the art of shaping heat-softened glass sheets by press bending in which a succession of heat-softened glass sheets is conveyed along a predetermined path and moved continuously between a pair of sets of shaping rolls rotatable about axes transverse to said path, each set comprising a plurality of shaped rotatable rolls having shaping surfaces of curved contour in their axial direction, each roll in one of said sets corresponding to a roll of said other set, said corresponding rolls having complementary shaping surfaces, said sets being relatively moveable between a retracted position and a glass sheet sandwiching position wherein said shaping members impress their shape onto said heat-softened glass sheets, the improvement comprising
 (a) continuously moving each of said glass sheets into position between said sets of shaping rolls while said sets are retracted and said rolls are rotating,
 (b) bringing said sets of shaping rolls into glass sheet engaging position momentarily so that each pair of opposing rolls simultaneously engages a moving longitudinal portion longitudinally spaced from other moving portions of said glass sheet engaged by other of said pairs of opposing rolls only for sufficient time for each pair of opposing rolls to contact a minor portion only of the length of said glass sheet until said longitudinal increments develop different localized portions of the shape desired without interrupting the forward movement of said glass sheet between said rotating rolls,
 (c) retracting at least one of said sets of rolls from said pressurized engagement before any of said longitudinally spaced portions is exposed to pressurized engagement by more than two adjacent opposing pairs of said sets of shaped rotating rolls, and
 (d) maintaining said set of rolls out of pressurized engagement until said glass sheet cools sufficiently for its surface to set.

30. The improvement as in claim 29, wherein said sheets are heated to an elevated temperature sufficient for press bending while supported on a hot gaseous bed.

31. The improvement as in claim 29, comprising simultaneously engaging different longitudinally spaced increments of said glass between rotating rolls having different complementary curvatures to impart a shape that changes from increment to increment.

32. The improvement as in claim 29, comprising simultaneously engaging different longitudinally spaced increments of said glass between rotating rolls at different distances from said path to impart a compound shape that includes a curved element about an axis parallel to said path and a curved element about an axis transverse to said path.

33. The improvement as in claim 29, comprising simultaneously engaging different longitudinally spaced increments of said glass between opposing pairs of rolls wherein at least one of said pairs is tilted relative to another of said pairs to include a twist in the shape imparted to the glass.

34. The improvement as in claim 29, wherein at least one of said sets of rotating rolls is retracted when one of said longitudinal glass sheet portions moves a distance approximately equal to the distance between adjacent pairs of opposing rolls.

35. The improvement as in claim 29, wherein each of said longitudinal glass sheet portions is simultaneously sandwiched between segments of opposing shaping rolls having varying diameters along their axial direction.

36. The improvement as in claim 35, wherein at least one of said segments of one of said opposing pair of rolls is driven and other of said shaping roll segments of said pair rotate freely at a peripheral speed approximately equal to the speed at which said glass sheets move between said opposing pairs of rolls.

References Cited
UNITED STATES PATENTS

| | | | |
|---|---|---|---|
| 3,545,951 | 12/1970 | Nedelec | 65—104 |
| 2,348,887 | 5/1944 | Drake | 65—106 |
| 3,409,422 | 11/1968 | Gulotta | 65—107 X |

FOREIGN PATENTS 816,495   7/1959   Great Britain.

ARTHUR D. KELLOGG, Primary Examiner

U.S. Cl. X.R.

65—245, 253, 273, 286